(12) United States Patent
Cho

(10) Patent No.: US 10,866,643 B2
(45) Date of Patent: Dec. 15, 2020

(54) SYSTEM, METHOD, AND NON-TRANSITORY COMPUTER-READABLE MEDIUM FOR PROVIDING CHAT DEVICE THROUGH TACTILE INTERFACE DEVICE

(71) Applicant: GACHON UNIVERSITY-INDUSTRY FOUNDATION, Seongnam-si (KR)

(72) Inventor: Jin soo Cho, Seoul (KR)

(73) Assignee: GACHON UNIVERSITY-INDUSTRY FOUNDATION, Seongnam-si (KR)

( * ) Notice: Subject to any disclaimer, the term of this patent is extended or adjusted under 35 U.S.C. 154(b) by 0 days.

(21) Appl. No.: 16/363,802

(22) Filed: Mar. 25, 2019

(65) Prior Publication Data
US 2019/0361529 A1 Nov. 28, 2019

(30) Foreign Application Priority Data
May 25, 2018 (KR) .................. 10-2018-0059773

(51) Int. Cl.
*G06F 3/048* (2013.01)
*G06F 3/01* (2006.01)
(Continued)

(52) U.S. Cl.
CPC ............ *G06F 3/016* (2013.01); *G06F 3/0482* (2013.01); *G06F 3/04842* (2013.01);
(Continued)

(58) Field of Classification Search
CPC ...... G06F 3/016; G06F 3/0488; G06F 3/0416; G06F 3/04886; G09B 21/004; G09B 21/003; G09B 21/007; G09B 21/02
See application file for complete search history.

(56) References Cited

U.S. PATENT DOCUMENTS 10,601,980 B1 * 3/2020 Engelke ................ G09B 21/008
2005/0021624 A1 * 1/2005 Herf ..................... H04L 12/1822
709/204
(Continued)

OTHER PUBLICATIONS

KR-20160066327; Kim et al., Method and Device for Supplying Tactile Message; 2016; 28 pages.*
(Continued)

*Primary Examiner* — Linh K Pham
(74) *Attorney, Agent, or Firm* — Studebaker & Brackett PC

(57) ABSTRACT

The present invention relates to a method, an apparatus, and a computer-readable medium for providing a chat device through a tactile interface device connected to the computing device to interact with a user, and more particularly, the chat module includes: an account management module for managing a user account of a user; a chat partner management module for managing one or more chat partners registered in the user account; a chat room management module for managing a chat room where the registered one or more chat partners are present; a chat conducting module for conducting a chat with chat room participants including the one or more chat partners in the chat room; and a tactile user interface (TUI) module for converting display data displayed on a screen of the computing device into an output signal for implementing a tactile screen of the tactile interface device.

9 Claims, 34 Drawing Sheets

(51) Int. Cl.
*H04L 12/58* (2006.01)
*G06F 3/0484* (2013.01)
*G09B 21/00* (2006.01)
*G06F 21/34* (2013.01)
*G06F 3/0482* (2013.01)

(52) U.S. Cl.
CPC .......... *G06F 21/34* (2013.01); *G09B 21/004* (2013.01); *H04L 51/04* (2013.01); *G06F 2221/2117* (2013.01)

(56) References Cited

U.S. PATENT DOCUMENTS

| | | | | |
|---|---|---|---|---|
| 2005/0108329 | A1* | 5/2005 | Weaver | H04L 12/1822 709/204 |
| 2008/0145822 | A1* | 6/2008 | Bucchieri | G09B 21/003 434/114 |
| 2011/0035695 | A1* | 2/2011 | Fawcett | G06F 3/04886 715/773 |
| 2011/0287393 | A1* | 11/2011 | Rebolledo-Mendez | G06F 3/016 434/113 |
| 2012/0299853 | A1* | 11/2012 | Dagar | G09B 21/003 345/173 |
| 2012/0315607 | A1* | 12/2012 | Shin | G06F 3/0488 434/114 |
| 2013/0290510 | A1* | 10/2013 | Klooster | G06Q 30/0207 709/224 |
| 2013/0332827 | A1* | 12/2013 | Smith | G09B 21/007 715/702 |
| 2015/0125831 | A1* | 5/2015 | Chandrashekhar Nair | G09B 21/004 434/114 |
| 2016/0364136 | A1* | 12/2016 | Ragavan | G06F 40/166 |
| 2017/0031581 | A1* | 2/2017 | Chilmulwar | G06F 3/04847 |
| 2017/0169730 | A1* | 6/2017 | Choi | G06F 3/0416 |
| 2017/0336960 | A1* | 11/2017 | Chaudhri | G06F 3/04817 |
| 2018/0214771 | A1* | 8/2018 | Tran | A63F 13/92 |
| 2018/0260555 | A1* | 9/2018 | Hardee | G06F 21/36 |
| 2019/0129608 | A1* | 5/2019 | Kim | G06F 3/04883 |

OTHER PUBLICATIONS

Kohlmann et al., Alternative Concepts for Accessible Virtual Classrooms for Blind Users; 2015; IEEE; 5 pages.*
Sicaru et al., Computer Gaming for the Visually Impaired—Status and Perspectives; 2018, IEEE; 7 pages.*
Ozioko et al., SmartFingerBraille: A tactile sensing and actuation based communication glove for deafblind people; 2017; IEEE; 5 pages.*

* cited by examiner

SYSTEM, METHOD, AND NON-TRANSITORY COMPUTER-READABLE MEDIUM FOR PROVIDING CHAT DEVICE THROUGH TACTILE INTERFACE DEVICE

CROSS-REFERENCE TO RELATED APPLICATION

This application claims priority to Korean Patent Application No. 10-2018-0059773 filed May 25, 2018 with the Korean Intellectual Property Office, the contents of which are incorporated herein by reference.

BACKGROUND OF THE INVENTION

1. Field of the Invention

The present invention relates to a system, a method, and a non-transitory computer-readable medium for providing a chat device through a tactile interface device, and more particularly, to a system, a method, and a non-transitory computer-readable medium for providing a chat device through a tactile interface device, which allow a visually impaired person to intuitively use, interact, and control the tactile interface device that corresponds to a multi-array tactile cell-based smart braille device in order to increase the efficiency of the use of a smart device (smart phone, smart pad, etc.) or a smart braille device and to improve the level of informatization of the visually impaired person, so that an intuitive chat device for a chat may be provided to the visually impaired persons.

2. Description of the Related Art

In the information society, it is essential to acquire and utilize information by using a computer, and such a trend is the same for visually impaired people as well as ordinary people.

In order to improve the level of informatization of the visually impaired people, it is necessary to enable the visually impaired people to acquire and utilize information at a level similar to that of the ordinary people, which is important in that daily lives of the visually impaired people can be more convenient, and the visually impaired people can acquire and utilize the information for themselves. In addition, ultimately, it may be very important in that the visually impaired people are provided with various educational opportunities to expand opportunities for entering and participating in the society, so that their welfare can be further improved.

However, a current general way to use a computer is mainly to visually recognize visual information outputted through a monitor and input information for the visual information by using an input tool such as a keyboard, a mouse, or a touch pad. Accordingly, there is a huge limitation to the visually impaired people who cannot use a vision in recognizing output information of the computer and performing an instant interaction such as information input for the output information at a level the same as that of the ordinary people. As a result, the visual impairment significantly reduces the efficiency in using the computer, thereby greatly depriving the visually impaired people of the opportunity to acquire and utilize the information through the computer.

In order to solve the difficulty in using the computer of the visually impaired people, various technologies have been developed to recognize the visual information and interact with the computer by using a hearing sense, a tactile sense, etc. As a representative technology, there is a screen reader which aids the visually impaired people to use the computer through the hearing sense. The screen reader is a device or software for enabling the use of the computer by outputting, with a voice, contents outputted on a computer screen and keyboard information inputted by a user.

However, since the screen reader searches for graphical user interface (GUI) elements of an output screen by using only linearized information arranged in one line without two-dimensional spatial position information with respect to the output screen, it is difficult to recognize screen output information. In particular, when information contained in the output screen increases, the difficulty is remarkably increased. In addition, since the screen reader provides only a text-based simple descriptive explanation for various graphic information such as pictures and diagrams other than characters or the GUI elements with a voice, the visually impaired people have great difficulty in understanding and interacting with the graphic information.

Another related art is a braille information terminal which delivers text information through the tactile sense by using braille cells. The braille information terminal may be used as an independent device for providing several functions of the computer useful to the visually impaired people, and may be used as an auxiliary screen output device for outputting the text information on the computer screen, which is analyzed by the screen reader, in braille. Both devices serve only as an alternate device that performs a few limited functions of the computer as a substitute for the computer, or only as an auxiliary output device that outputs the text information in braille, rather than as an interface for efficiently interacting with the computer. In particular, similar to the screen reader, the braille information terminal specialized for outputting the braille may not express the graphic information.

SUMMARY OF THE INVENTION

An object of the present invention is to provide a system, a method, and a non-transitory computer-readable medium for providing a chat device through a tactile interface device, which allow a visually impaired person to intuitively use, interact, and control the tactile interface device that corresponds to a multi-array tactile cell-based smart braille device in order to increase the efficiency of the use of a smart device (smart phone, smart pad, etc.) or a smart braille device and to improve the level of informatization of the visually impaired person, so that an intuitive chat device for a chat may be provided to the visually impaired persons.

To achieve the objects described above, according to an embodiment of the present invention, there is provided a system implemented by a computing device including a processor to provide a chat device through a tactile interface device connected to the computing device to interact with a user, wherein the computing device includes a chat module for conducting a chat with a chat partner through the tactile interface device, and the chat module includes: an account management module for managing a user account of a user; a chat partner management module for managing one or more chat partners registered in the user account; a chat room management module for managing a chat room where the registered one or more chat partners are present; a chat conducting module for conducting a chat with chat room participants including the one or more chat partners in the chat room; and a tactile user interface (TUI) module for converting display data displayed on a screen of the computing device into an output signal for implementing a tactile screen of the tactile interface device.

According to an embodiment of the present invention, the TUI module may generate a chat-related output signal for implementing the tactile screen of the tactile interface device corresponding to the screen of the computing device and may generate a chat-related input signal, which is to be inputted to the chat module, from a user input inputted to the tactile interface device, the chat-related output signal may include a control signal for a two-dimensional tactile cell array, and the tactile screen of the tactile display device implemented by the chat-related output signal may include: a content area implemented based on a content part of a screen displayed on the computing device by the chat module; and a cursor area for implementing a current position and a shape of a cursor of the user.

According to an embodiment of the present invention, the content area may be divided into a plurality of sub-content areas, the cursor area may be divided into a plurality of sub-cursor areas, a position of the cursor implemented in the cursor area may correspond to a position of a focused sub-content area, the sub-cursor area and the sub-content area corresponding to the sub-cursor area may be aligned on a single axis, and the sub-cursor area may include: an input selection cursor area for selecting the sub-content area corresponding to the sub-cursor area to input data; and a chat partner classification cursor area for identifying the chat room participants including the one or more chat partners who input a chat content displayed in the chat room.

According to an embodiment of the present invention, the account management module may include: an account generation module for generating the user account by registering a user authentication device of the user; an account access module for accessing the user account with the registered user authentication device; and an account disconnect module for disconnecting the accessed user account.

According to an embodiment of the present invention, the chat partner management module may include: a chat partner list management module for managing a chat partner list including the one or more chat partners registered in the accessed user account; a chat partner addition module for adding a chat partner to the chat partner list by inputting a user account of the chat partner; and a chat partner deletion module for deleting one or more chat partners selected from the one or more chat partners included in the chat partner list.

According to an embodiment of the present invention, the chat partner list management module may include: a chat partner list display unit for displaying chat partner list display data for the chat partner list including the one or more chat partners on the screen of the computing device; and a chat partner selection unit for selecting the one or more chat partners from the one or more chat partners included in the chat partner list by a user input inputted to the tactile interface device, the TUI module may generate a chat partner list output signal for implementing a tactile screen of the tactile interface device corresponding to a screen of the computing device based on the chat partner list display data and may generate a chat partner selection input signal, which is to be inputted to the chat partner selection unit, from a user input inputted to the tactile interface device, the chat partner list output signal may be implemented in the content area and can be implemented in one or more sub-content areas included in the content area, and the chat partner selection input signal may be selected by one or more input selection cursor areas corresponding to the one or more sub-content areas in which the chat partner list output signal is implemented to input data.

According to an embodiment of the present invention, the one or more chat partners may be implemented in the one or more sub-content areas in which the chat partner list output signal is implemented, and the one or more chat partners may be selected by the one or more input selection cursor areas corresponding to the one or more sub-content areas, respectively.

According to an embodiment of the present invention, the chat room management module may include: a chat room open display unit for displaying chat room open display data for opening the chat room shared with the chat room participants including the one or more chat partners, which are selected by the chat partner list management module, on the screen of the computing device; and a chat room open unit for opening the chat room where the chat participants are present by a user input inputted to the tactile interface device, the TUI module may generate a chat room open output signal for implementing a tactile screen of the tactile interface device corresponding to a screen of the computing device based on the chat room open display data and may generate a chat room open input signal, which is to be inputted to the chat room open unit, from a user input inputted to the tactile interface device, the chat room open output signal may be implemented in the one or more sub-content areas included in the content area in which the chat partner list output signal is implemented, and the chat room open input signal may be selected by one or more input selection cursor areas corresponding to the one or more sub-content areas in which the chat room open output signal is implemented to input data.

According to an embodiment of the present invention, when the previously opened chat room shared with the chat room participants exists, the chat room management module may include: a chat room change display unit for displaying chat room change display data for changing the chat room to a previously opened chat room on the screen of the computing device; and a chat room change unit for changing the chat room to the previously opened chat room by a user input inputted to the tactile interface device, the TUI module may generate a chat room change output signal for implementing a tactile screen of the tactile interface device corresponding to a screen of the computing device based on the chat room change display data and may generate a chat room change input signal, which is to be inputted to the chat room change unit, from the user input inputted to the tactile interface device, the chat room change output signal may be implemented in the one or more sub-content areas included in the content area in which the chat partner list output signal is implemented, and the chat room change input signal may be selected by one or more input selection cursor areas corresponding to the one or more sub-content areas in which the chat room change output signal is implemented to input data.

According to an embodiment of the present invention, the chat conducting module may include: a chat conducting display unit for displaying chat conducting display data for conducting the chat with the chat room participants in the chat room, which is opened by the chat room management module or changed, on the screen of the computing device; and a chat conducting unit for transmitting a chat content of the user inputted to the tactile interface device to the chat participants and receiving chat contents inputted by the chat participants, the chat conducting display unit may include: a chat partner classification display unit for displaying chat partner classification display data to identify the user and the chat room participants who input the chat contents in the chat room on the screen of the computing device; an input chat content display unit for displaying input chat content display data for the chat content of the user inputted to the tactile interface device on the screen of the computing device; and a received chat content display unit for displaying received chat content display data for the received chat contents inputted by the chat participants on the screen of the computing device, the TUI module may generate a chat conducting output signal including a chat partner classification output signal, an input chat content output signal, and a received chat content output signal to implement a tactile screen of the tactile interface device corresponding to a screen of the computing device based on the chat conducting display data including the chat partner classification display data, the input chat content display data, and the received chat content display data, and may generate a chat conducting input signal including the chat content of the user, which is to be inputted to the chat conducting unit, from a user input inputted to the tactile interface device, and the chat conducting output signal may be implemented in the content area.

According to an embodiment of the present invention, the input chat content output signal and the received chat content output signal may be implemented in the one or more sub-content areas constituting the content area in which the chat conducting output signal is implemented, the chat partner classification output signal may be implemented in the chat partner classification cursor area which is the one or more sub-cursor areas corresponding to the one or more sub-content areas, the one or more sub-content areas in which the input chat content output signal and the received chat content output signal are implemented may be classified by one or more chat partner classification cursor areas corresponding to the one or more sub-content areas, and the chat partner classification cursor areas may identify the user and the chat room participants by mutually different braille outputs of the tactile interface device.

According to an embodiment of the present invention, the chat conducting module may further include: a chat room participant list display unit for displaying chat room participant list display data for a chat room participant list including the chat room participants on the screen of the computing device, the TUI module may generate a chat room participant list output signal for implementing a tactile screen of the tactile interface device corresponding to a screen of the computing device based on the chat room participant list display data, the chat room participant list output signal may be implemented in the content area and can be implemented in the one or more sub-content areas constituting the content area, the chat partner classification output signal may be implemented in the chat partner classification cursor area which is the one or more sub-cursor areas corresponding to the one or more sub-content areas, the one or more sub-content areas in which the chat room participant list output signal is implemented may be classified by the one or more chat partner classification cursor areas corresponding to the one or more sub-content areas, and the chat partner classification cursor areas may identify the chat room participants by the mutually different braille outputs of the tactile interface device.

According to an embodiment of the present invention, wherein the chat conducting module may further include: a chat content history display unit for displaying chat content history display data for a chat content history of the user and the chat participants on the screen of the computing device; and a chat content history search unit for moving through the chat content to search for data by a user input inputted to the tactile interface device, the TUI module may generate a chat content history output signal for implementing a tactile screen of the tactile interface device corresponding to a screen of the computing device based on the chat content history display data and may generate a chat content history search input signal, which is to be inputted to the chat content history search unit, from the user input inputted to the tactile interface device, the chat content history output signal may be implemented in the content area and can be implemented in the one or more sub-content areas constituting the content area, the chat partner classification output signal may be implemented in the chat partner classification cursor area which is the one or more sub-cursor areas corresponding to the one or more sub-content areas, the one or more sub-content areas in which the chat content history output signal is implemented may be classified by the one or more chat partner classification cursor areas corresponding to the one or more sub-content areas, and the chat partner classification cursor areas may identify the chat room participants by the mutually different braille outputs of the tactile interface device.

According to an embodiment of the present invention, the visually impaired person can perform an electronic chat function at a level similar to a level of ordinary people by using a braille device or the tactile interface device.

DETAILED DESCRIPTION OF THE INVENTION

In the following, various embodiments and/or aspects will now be described with reference to the drawings. In the following description, for purposes of explanation, numerous specific details are set forth in order to provide a thorough understanding of one or more aspects. However, it will also be appreciated by those of ordinary skill in the art that such aspect(s) may be practiced without these specific details. The following description and the annexed drawings describe certain illustrative aspects of the one or more aspects in detail. It is to be understood, however, that such aspects are illustrative and some of the various ways of practicing various aspects of the principles of various aspects may be utilized, and that the description set forth is intended to include all such aspects and their equivalents.

1. Braille OS Module as Virtual Operating System for Controlling Tactile Interface Device FIG. 1 is a view schematically showing an overall system including a tactile interface device and a computing device according to an embodiment of the present invention.

Figure 1:
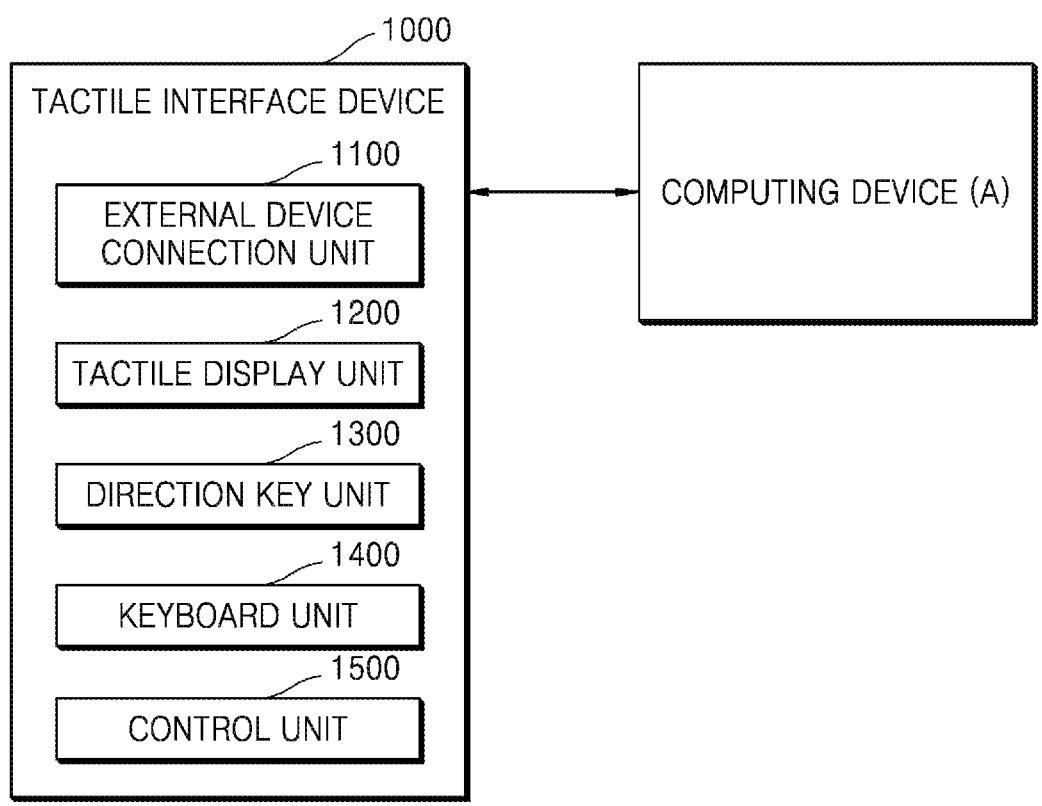
FIG. 1 is a view schematically showing an overall system including a tactile interface device and a computing device according to an embodiment of the present invention.

A tactile interface device 1000 shown in FIG. 1 is provided only as an example, and the present invention is not limited thereto. The tactile interface device 1000 connected to a computing device A for controlling the tactile interface device according to the present invention, which is described hereinafter, includes all of any interface device capable of providing a tactile graphic, a tactile interface device capable of interacting with a user, and a computing device capable of outputting the tactile graphic.

As shown in FIG. 1, the computing device A is connected to the tactile interface device 1000, and such connection includes both wired connection and wireless connection.

The computing device A may include a smart phone, a tablet, a personal computer (hereinafter referred to as "PC"), a mobile phone, a videophone, an e-book reader, a desktop PC, a laptop PC, a netbook PC, a personal digital assistant (hereinafter referred to as "PDA"), a portable multimedia player (hereinafter referred to as "PMP"), an mp3 player, a portable medical device, a camera, a wearable device (for example, a head-mounted device, hereinafter referred to as "HMD"), an electronic garment, an electronic bracelet, an electronic necklace, an electronic appcessory, an electronic tattoo, and a smart watch.

The computing device A may include at least one processor and memory, and may be selectively connected to a display device such as a monitor or may be provided therein with a display module.

Alternatively, the computing device A may be in a form combined with the tactile interface device 1000. In this case, the tactile interface device 1000 and the computing device A for controlling the tactile interface device 1000 may be recognized as a single device from the viewpoint of the user. In the case of the above combination-type device, the computing device A and the tactile interface device 1000 may be in the form of sharing the processor and the memory.

The tactile interface device 1000 shown in FIG. 1 includes: an external device connection unit 1100 for performing wired or wireless communication with the computing device A or the like; a tactile display unit 1200 for providing tactile information to a user through a plurality of pins; a direction key unit 1300 for changing a position of an input coordinate or a focused detailed content; a keyboard unit 1400 for receiving information from the user in form of a key input; and a control unit 1500 for controlling operations of the external device connection unit 1100, the tactile display unit 1200, the direction key unit 1300, and the keyboard unit 1400.

The external device connection unit 1100 includes one or more of a communication module unit for performing wireless communication and a wired connection unit for accessing an external device in a wired manner. The communication module unit includes at least one of a Bluetooth communication module, a Zigbee communication module, an infrared communication module, a Bluetooth low energy (BLE) communication module, an audio communication module, a long term evolution (LTE) communication module, a WiFi communication module, an IrDA-based infrared communication module, a wireless LAN (WLAN), a WiBro module, and a wireless USB module. Meanwhile, the wired connection unit 1120 preferably includes a connection module using a universal serial bus (USB) interface, as well as a wired connection module capable of transmitting and receiving data.

The tactile display unit 1200 may provide the tactile information by using a tactile pixel having at least one dimension, and the tactile pixel may include a plurality of pins moved up and down by applying a power to a transducer including a piezoelectric ceramic and an elastic body. Preferably, the tactile pixel provides the tactile information in two dimensions.

The tactile display unit 1200 includes: a display data reception unit for providing data received from an external user terminal, or receiving data generated in the tactile interface device; a tactile data conversion unit for converting the data into tactile display data; a plurality of pin drive modules driven by the tactile display data; and a driving power supply unit for receiving a power for driving the tactile display unit 1200, wherein the tactile display unit 1200 provides the tactile information or the tactile graphic based on the received data.

The tactile display unit 1200 may display or provide the tactile pixel having at least one dimension. In one example, the tactile pixel may include a plurality of pins moved up and down by applying the power to the transducer including the piezoelectric ceramic and the elastic body.

In detail, the tactile pixel is displayed by a plurality of pin drive module groups, and each of the pin drive module groups includes a plurality of pin drive modules. Alternatively, an entire pin drive module may constitute a single pin drive module group.

Meanwhile, the direction key unit 1300 changes the position of the input coordinate or the focused detailed content.

The keyboard unit 1400 is configured in the form of a key which can be inputted to the tactile interface device 1000 by a visually impaired person. The keyboard unit 1400 may include a plurality of keys, and an input of each of the keys may be converted into an instruction of an application being executed in the computing device A.

Meanwhile, the user inputs instructions or information to the tactile interface device through the direction key unit 1300 and the keyboard unit 1400, and the tactile interface device 1000 converts the inputted instructions or information so as to transmit the converted instructions or information to the computing device A.

Meanwhile, the keyboard unit 1400 preferably includes a braille keyboard for converting braille characters which are currently used frequently and generally by the visually impaired person into general characters to transmit a character input signal to a computer.

The keyboard unit 1400 receives the braille to transmit the braille to the tactile interface device 1000 or the computing device A connected to the tactile interface device 1000. The keyboard unit 1400 may include a braille key, a shortcut key, and an enter or space key. Since the braille includes several dots to form a single letter, when the braille key is simultaneously pressed, information of a resulting braille may be transmitted. The transmitted braille information may be braille-translated into a general character through software in the tactile interface device 1000 or software of the computing device.

Accordingly, for the purpose of a computer input/output function for the visually impaired person, the tactile display unit 1200 serves the same role as a monitor of a general computer, and the direction key unit 1300 and the keyboard unit 1400 serve as input devices such as a keyboard or a mouse of the general computer.

Figure 2:
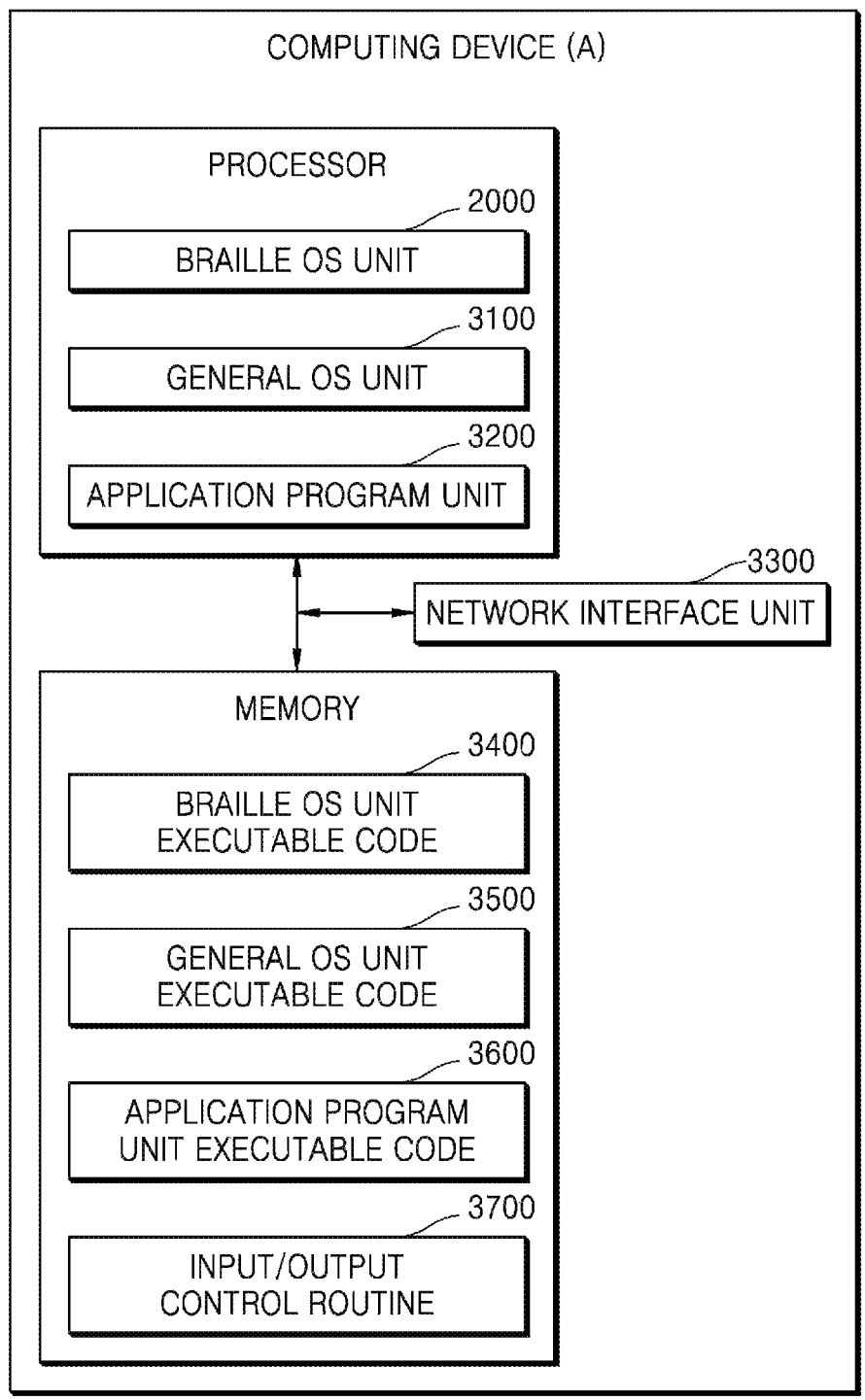
FIG. 2 is a view schematically showing an internal configuration of the computing device according to an embodiment of the present invention.

FIG. 2 is a view schematically showing an internal configuration of the computing device according to an embodiment of the present invention.

According to an embodiment of the present invention, the computing device for controlling the tactile interface device 1000 may include a processor, a network interface unit, a memory, and a bus (corresponding to a bi-directional arrow between the processor, the memory, and the network interface unit). The memory may include a braille OS unit executable code 3400, a general OS unit executable code 3500, an application program unit executable code 3600, and an input/output control routine 3700. The processor may include a braille OS unit 2000; a general OS unit 3100; and an application program unit 3200. In this case, the general OS unit 3100 corresponds to a main operating system of the computing device, and may include an ANDROID OS of GOOGLE, a WINDOWS OS of MICROSOFT, etc.

In other embodiments, the computing device A for controlling the tactile interface device 1000 may include more components than the components of FIG. 2.

The memory is a computer-readable recording medium, and may include a permanent mass storage device such as a random access memory (RAM), a read only memory (ROM), and a disk drive. In addition, the braille OS unit executable code 3400, the general OS unit executable code 3500, the application program unit executable code 3600, and the input/output control routine 3700 may be stored in the memory. The above software components may be loaded from a recording medium which is readable in an additional computer other than the memory by using a drive mechanism (not shown). The above recording medium readable in the additional computer may include a computer-readable recording medium (not shown) such as a floppy drive, a disk, a tape, a DVD/CD-ROM drive, and a memory card. In other embodiments, the software components may be loaded into the memory via a network interface unit 3300 other than the computer-readable recording medium.

The bus may enable communication and data transmission between the components of the computing device for controlling the tactile interface device. The bus may be configured by using a high-speed serial bus, a parallel bus, a storage area network (SAN), and/or other suitable communication technologies.

The network interface unit 3300 may be a computer hardware component for connecting the computing device A for controlling the tactile interface device 1000 to a computer network. The network interface unit 3300 may connect the computing device for controlling the tactile interface device to the computer network via wireless or wired connection. Via the network interface unit 3300, the computing device for controlling the tactile interface device may be connected to the tactile interface device in a wireless or wired manner.

The processor may be configured to process an instruction of the computer program by performing basic calculation, logic, and an input/output operation of the computing device for controlling the tactile interface device. The instruction may be provided to the processor by the memory or the network interface unit 3300 and via the bus. The processor may be configured to execute program codes for the braille OS unit 2000, the general OS unit 3100, and the application program unit 3200. The above program codes may be stored in a recording device such as a memory.

The braille OS unit 2000 may be configured to perform a method of controlling the tactile interface device 1000, which will be described below. In the above processor, depending on the method of controlling the tactile interface device, some components may be omitted, additional components not shown in the drawings may be further included, or at least two components may be combined.

Figure 3:
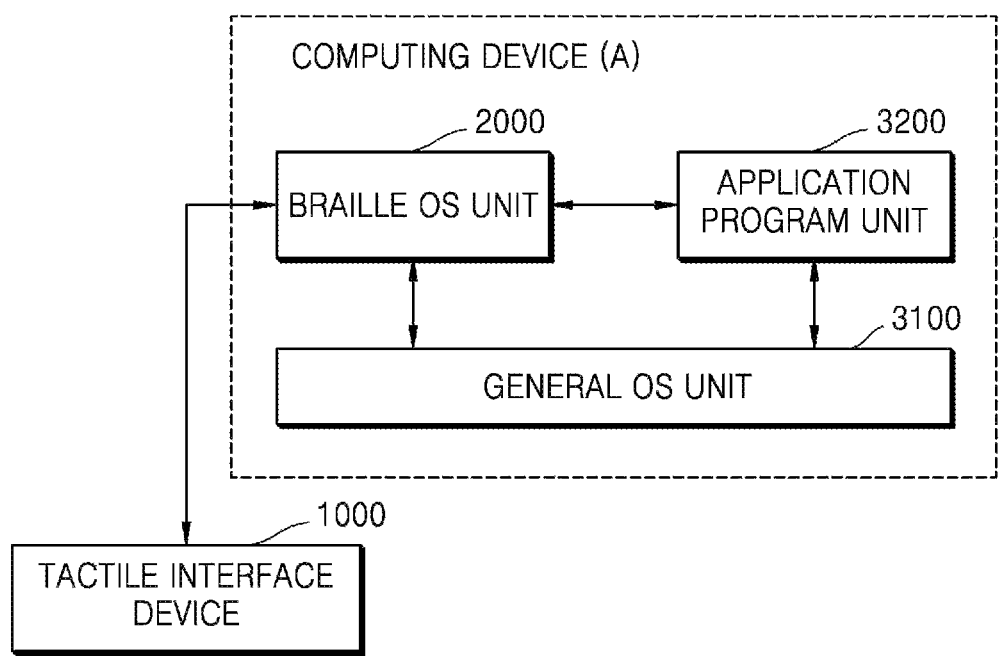
FIG. 3 is a view schematically showing an operating environment of a braille OS unit according to an embodiment of the present invention.

FIG. 3 is a view schematically showing an operating environment of a braille OS unit according to an embodiment of the present invention.

The general OS unit 3100 corresponds to a software module corresponding to the main operating system of the computing device A, and the braille OS unit 2000 and the application program unit 3200 are driven under the control of the general OS unit 3100. In other words, according to the present invention, the method of controlling the tactile interface device may be implemented by the braille OS unit corresponding to a virtual sub-operating system for the tactile interface device, which is operated under the control of the main operating system of the computing device A.

The braille OS unit 2000 controls an overall operation related to the driving and the input/output of the tactile interface device 1000 while controlling the input/output between the application program unit 3200 operated under the control of the general OS unit 3100 and the tactile interface device 1000.

In addition, the braille OS unit 2000 may include an application program for controlling an environment of the tactile interface device 1000, and an embedded basic program which is capable of performing the input/output in the tactile interface device 1000.

Meanwhile, in the environment of the braille OS unit 2000, developers may develop software or application programs for the visually impaired person based on an actual display of the computing device, for example, a display of a smart phone, and the input/output of the above application programs with respect to the tactile interface device 1000 may be performed by the braille OS unit 2000.

In other words, according to the braille OS unit 2000 for performing the method of controlling the tactile interface device of the present invention, when a general developer develops software having a general GUI, the developed software may be implemented in the tactile interface device 1000 through the braille OS unit 2000 in such a form that the visually impaired person may perform input/output, so that a general software developer can supply various software to the visually impaired person.

Figure 4:
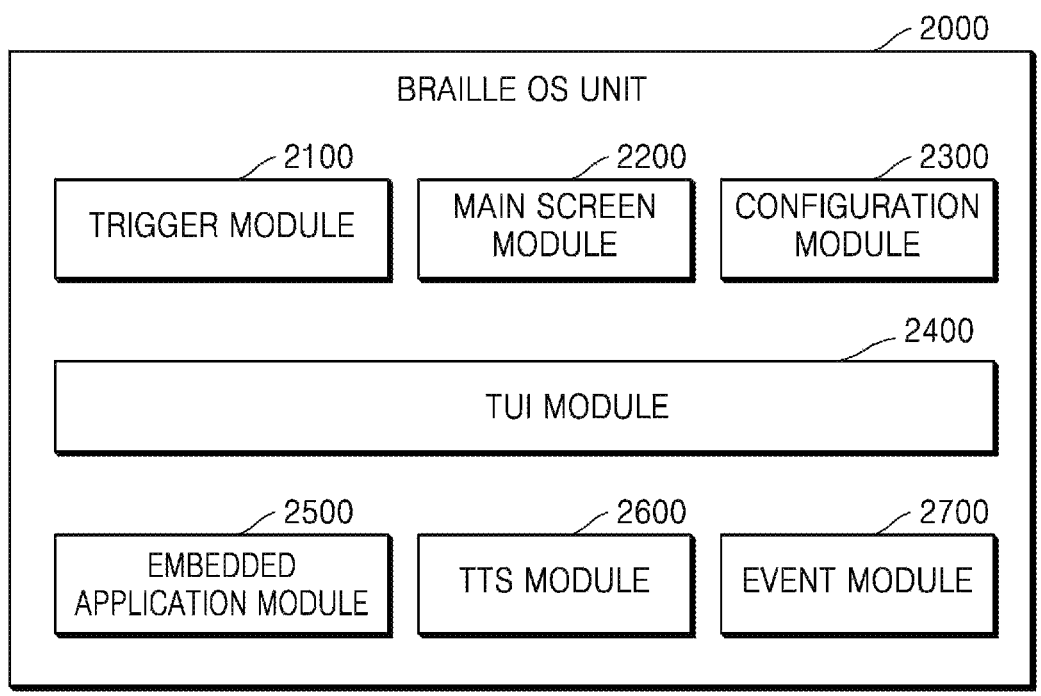
FIG. 4 is a view schematically showing an internal configuration of the braille OS unit according to an embodiment of the present invention.

FIG. 4 is a view schematically showing an internal configuration of the braille OS unit according to an embodiment of the present invention. As shown in FIG. 4, the braille OS unit 2000 includes a trigger module 2100, a main screen module 2200, a configuration module 2300, a tactile user interface (TUI) module 2400, an embedded application module 2500, a text-to-speech (TTS) module 2600, and an event module 2700.

The trigger module 2100 performs: confirming connection between the computing device A and the tactile interface device 1000; and calling execution of a step of executing the main screen module 2200 when it is determined that the computing device A and the tactile interface device 1000 are connected to each other.

Basically, the braille OS unit 2000 is executed in a computing device that interfaces with a visual display. Therefore, it is necessary to execute the braille OS unit in order to allow the visually impaired person to use the tactile interface device by executing each of the modules of the braille OS unit in the computing device.

In general, an application on the smart phone is executed by the user by identifying an application icon or the like on a GUI of the smart phone and performing a touch input, but it may be difficult for the visually impaired person to perform such an operation.

Unlike an application executed in a general computing device, since the braille OS unit is executed by the visually impaired person having difficulty in visual recognition, the trigger module 2100 operates in a background of the main operating system, and primarily calls execution of the main screen module 2200 when the visually impaired person connects the tactile interface device to the computing device A (preferably, such connection is established as the visually impaired person inputs a physical button present on the tactile interface device).

Figure 5:
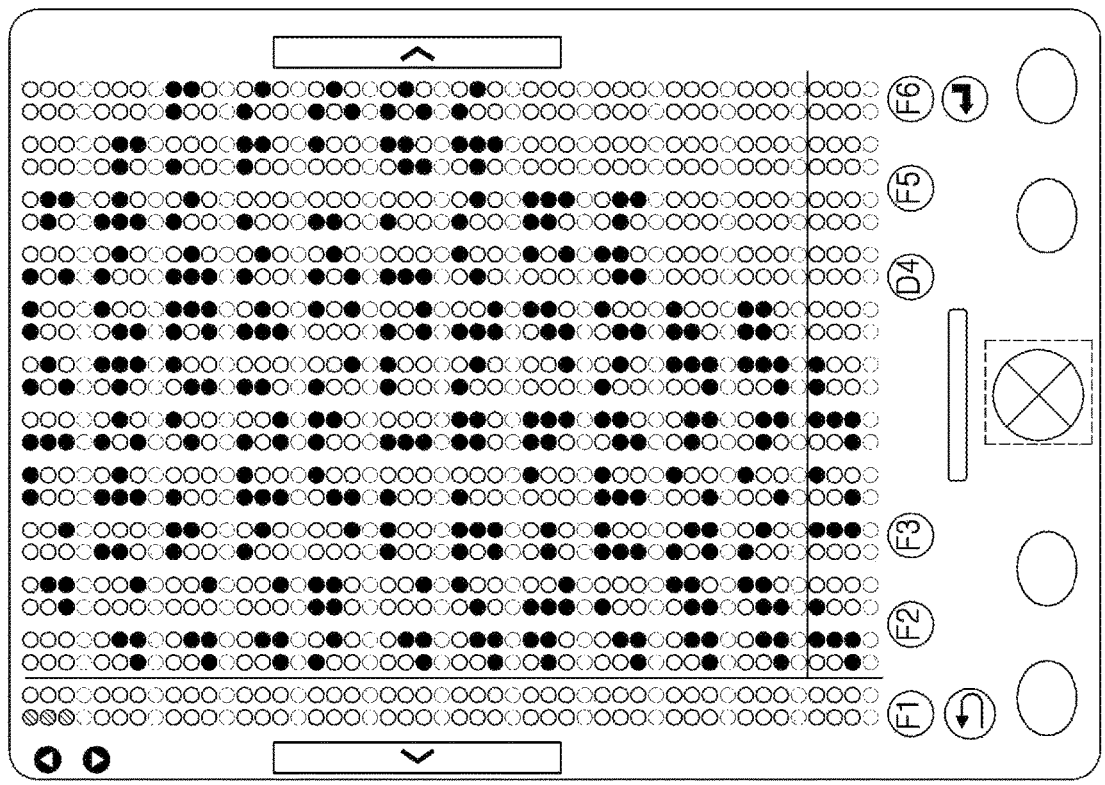
FIGS. 5A and 5B are views schematically showing display screens of the computing device and a tactile display of the tactile interface device according to an embodiment of the present invention.

For example, when the tactile interface device as shown in FIGS. 5A and 5B is started, the main screen module 2200 may display a main screen of the braille OS unit similarly to a window desktop screen, and provide a page for allowing the user to select a desired module or function on the main screen.

Preferably, the main screen module 2200 simply provides an interface displayed on the computing device as shown in FIG. 5A. In other words, when the main screen module is executed, the visual display device connected to the computing device displays a GUI interface as shown in FIG. 5A. At the same time, an output signal of the GUI interface is converted into an output signal of a tactile interface by the TUI module 2400, and the converted output signal is transmitted to the tactile interface device 1000, so that the visually impaired person may recognize the main screen with a tactile sense. Both of an application program mounted in the braille OS unit or an external application program operated under the control of the braille OS unit may be created to provide such a GUI.

Meanwhile, the main screen module 2200 is provided by the braille OS unit 2000. In other words, when the braille OS unit 2000 is executed, the main screen module primarily provided by the braille OS unit, that is, the sub-operating system executed under the control of the main operating system, is executed. Alternatively, the main screen module may be executed by the trigger module.

The configuration module 2300 is a module that provides an interface for changing settings of the braille OS unit 2000 and/or settings of the tactile interface device 1000. Similarly, when the configuration module 2300 is executed, an interface for changing settings is provided in the display device connected to the computing device A, and the TUI module 2400 simultaneously converts the interface into a form which enables input/output in the tactile interface device 1000.

The TUI module 2400 generates an output signal for implementing a tactile screen of the tactile interface device 1000 corresponding to a screen displayed on the computing device A by the main screen module or other application modules, and generates an input signal, which is to be inputted to the main screen module 2200, from a user input inputted to the tactile interface device 1000.

In other words, the TUI module 2400 is provided by the main screen module 2200 and the braille OS unit 2000, and serves to convert a GUI of an embedded application or an external application running under the control of the main operating system into a tactile user interface (TUI) interfaceable with the tactile interface device 1000.

Accordingly, when the general developer develops only general software that is operable in the computing device A, an interface of the software is converted into a form which can be interfaced in the tactile interface device by the TUI module 2400, and as a result, the visually impaired person may use the software.

In other words, the braille OS unit 2000 may perform: an application module execution step which is called according to a user input in the main screen module 2200; and a second TUI step of executing the TUI module provided by the sub-operating system. In the second TUI step, an output signal for implementing a tactile screen of the tactile interface device corresponding to a screen displayed on the computing device by the application module is generated, and an input signal, which is to be inputted to the application module, is generated from a user input inputted to the tactile interface device.

The embedded application module 2500 may include an application such as an alarm application, a clock application, a basic document creator application, and a basic document viewer application.

Similarly, although the embedded application is created based on a GUI for ordinary people, the embedded application may also be used by the visually impaired person through the tactile interface device by the TUI module 2400.

The TTS module 2600 performs a TTS function for the elements displayed or tactually displayed by the main screen module 2200, the configuration module 2300, or other application modules, or performs a function of requesting execution of the TTS function to a module having the TTS function operated in the main operating system while providing text information which is subject to the TTS function.

The event module 2700 generates an event notification output signal to the tactile interface device based on a connection state between the user terminal and the tactile interface device. The visually impaired person may not easily recognize a case when the tactile interface device interfacing with the visually impaired person is disconnected from the computing device. In order to solve such a problem, the braille OS unit provides the event module so as to perform a function of immediately transmitting information on a connection failure to the tactile interface device.

FIGS. 5A and 5B are views schematically showing display screens of the computing device and a tactile display of the tactile interface device according to an embodiment of the present invention.

FIG. 5A is a view showing a display screen of the computing device when the main screen module is executed in a case where the computing device is a smart phone, and FIG. 5B is a view showing a state of the tactile interface device at the time when FIG. 5A is displayed. The main screen module 2200 displays items (contents) in a one-dimensional array, and displays a cursor corresponding to each of the items such that the cursor is positioned next to each of the items. In other words, the main screen module divides the contents into a plurality of units, and displays the contents which are divided into the units on the computing device. Then, the TUI module 2400 classifies the contents that are divided into the units by a plurality of sub-content areas.

Similarly, in the tactile interface device 1000, items (contents) are displayed in a one-dimensional array, and a cursor corresponding to each of the items is displayed to be positioned next to each of the items.

Figure 6:
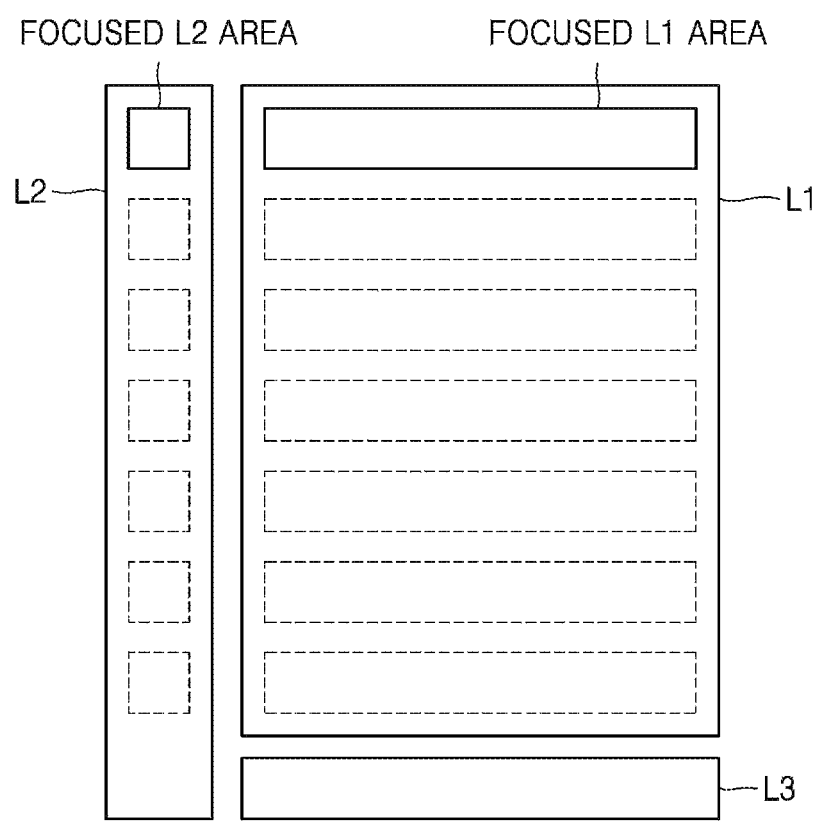
FIG. 6 is a view schematically showing an area configuration of the tactile display of the tactile interface device according to an embodiment of the present invention.

FIG. 6 is a view schematically showing an area configuration of the tactile display of the tactile interface device according to an embodiment of the present invention.

The tactile screen of the tactile interface device, which is implemented by the output signal generated by the TUI module 2400, includes: a content area L1 implemented based on a content part (items in FIG. 5) of a screen displayed on the computing device A by the main screen module 2200; a cursor area L2 for implementing a current position and a shape of a cursor of a user; and a page area L3 implemented based on page information of the screen displayed on the computing device by the main screen module 2200.

In addition, the content area may be divided into a plurality of sub-content areas, the cursor area may be divided into a plurality of sub-cursor areas, and a position of the cursor implemented in the cursor area preferably corresponds to a position of a focused sub-content area. This type of tactile display corresponds to a structure that allows the visually impaired person to recognize information and perform input most efficiently.

The sub-content area includes a plurality of braille cell groups, and each of the braille cell groups includes a plurality of braille cells, for example, six braille cells. In this case, a single braille cell refers to a single braille hole.

Similarly, each of the sub-cursor areas includes one or more braille cells, preferably a plurality of braille cells capable of notifying position and shape information of the cursor.

More preferably, as in the "focused L2 area" and the "focused L1 area" of FIG. 6, the sub-cursor area and the sub-content area corresponding to the sub-content area are aligned on a single axis.

2. Method of Providing Chat Device Through Tactile Interface Device

Figure 7:
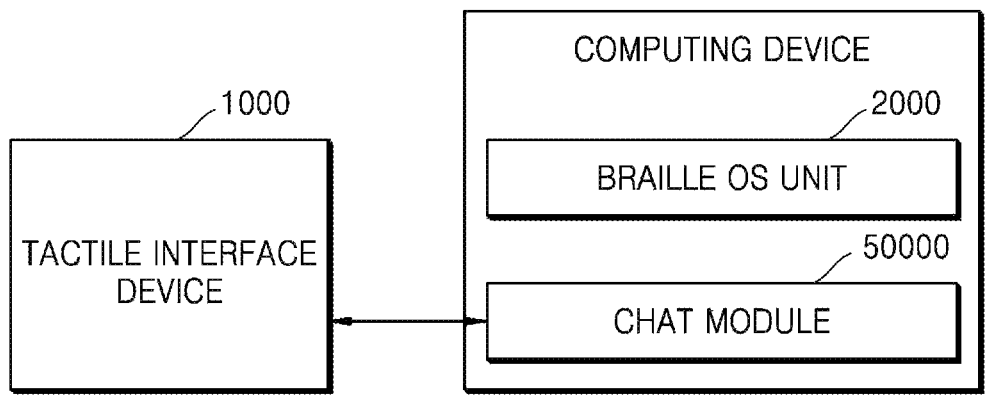
FIG. 7 is a view schematically showing a configuration of a chat module and the tactile interface device according to an embodiment of the present invention.

FIG. 7 is a view schematically showing a configuration of a chat module and the tactile interface device according to an embodiment of the present invention.

The computing device A shown in FIG. 7 has a configuration according to the above description set forth with reference to FIGS. 2 and 3. Meanwhile, the braille OS unit

2000 of FIG. 7 has a configuration according to the description set forth with reference to FIG. 4. Meanwhile, a chat module 50000 of FIG. 7 may be one example of the application program unit 3200 of FIG. 3, or may be the embedded application module 2500 of FIG. 4.

Similarly, the information outputted from the chat module 50000 may be displayed in a visual form recognizable to ordinary people on the display device connected to the computing device A. Likewise, an input/output signal may be converted into a form which is interfaceable with the visually impaired person in the tactile interface device 1000 by a common TUI module 2400 mounted in the braille OS unit 2000 or a separate TUI module only for the chat module 50000 that is mounted in the chat module 50000.

Preferably, in an embodiment of the present invention, the braille OS unit 2000 includes a common TUI module 2400, and the chat module 50000 preferably includes a separate TUI module 52000 which allows the visually impaired person to smoothly interface with the chat module 50000 in consideration of distinct characteristics of the chat module 50000.

Similarly, the chat module 50000 is executed under the control of the braille OS unit 2000, and the TTS module 2600, the event module 2700, and the like may be simultaneously executed while the chat module 50000 is being controlled.

Figure 8:
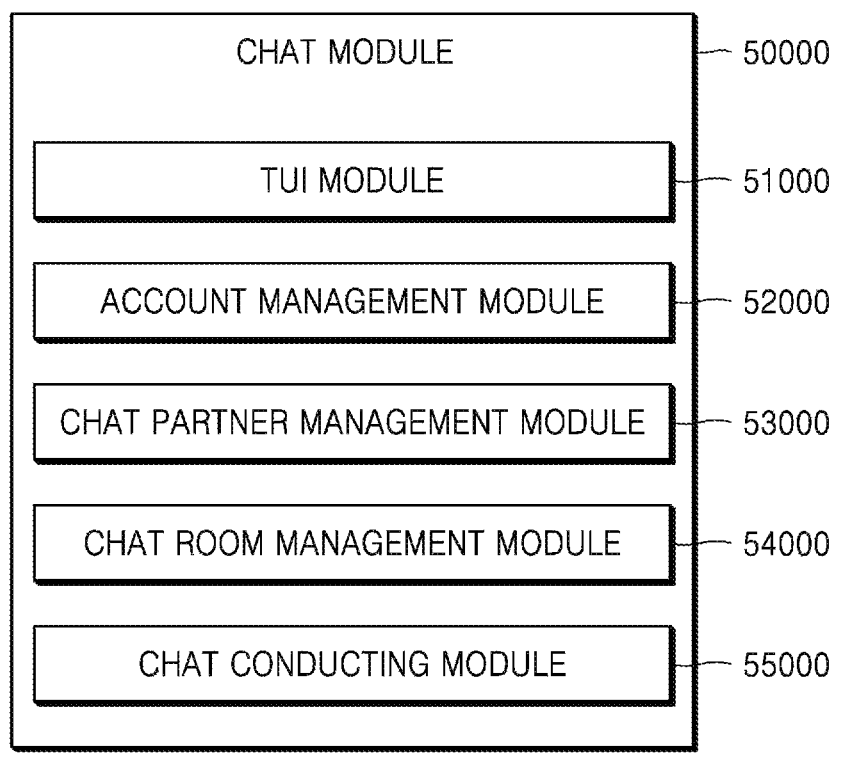
FIG. 8 is a view schematically showing an internal configuration of the chat module according to an embodiment of the present invention.

FIG. 8 is a view schematically showing an internal configuration of the chat module according to an embodiment of the present invention.

As described above, the chat module 50000 is implemented by the computing device A including the processor to provide a chat service through the tactile interface device 1000 connected to the computing device A to interact with the user.

Meanwhile, the chat module 50000 includes: a TUI module 51000 for converting a signal inputted to and outputted from an internal function module of a braille clock module into a form which is more intuitively recognized or inputted in the tactile interface device 1000 (in this case, the TUI module is preferably a separate module included in the braille clock module other than the TUI module 2400 of the braille OS unit 2000 shown in FIG. 4); an account management module 52000 for managing a user account of a user; a chat partner management module 53000 for managing one or more chat partners registered in the user account; a chat room management module 54000 for managing a chat room where chat room participants including the registered one or more chat partners are present; and a chat conducting module 55000 for conducting a chat with the chat room participants in the chat room.

The TUI module 51000 converts display data displayed on the screen of the computing device A in the account management module 52000, the chat partner management module 53000, the chat room management module 54000, and the chat conducting module 55000 into an output signal for implementing a tactile screen of the tactile interface device.

Meanwhile, the TUI module 51000 is different from the TUI module 2400 of the braille OS unit 2000 in that a tactile cell may be controlled in different schemes depending on an information provision method due to the distinct characteristics of the chat module 50000 as will be described below, such as a scheme of implementing a sub-cursor area for identifying one or more chat partners displayed on the tactile screen of the tactile interface device 1000 through the chat module 50000, instead of a scheme of converting all the information which is displayed as a graphic into a tactile graphic form in the tactile interface device 1000 in the same manner. According to a tactile cell control scheme of the TUI module 51000, the visually impaired person may more intuitively communicate with the one or more chat partners through the tactile interface device 1000.

A graphic interface for conducting a chat with one or more chat partners is outputted on the screen of the computing device A when the chat module 50000 is executed. In other words, the chat module 50000 is an application which may be used by ordinary people similarly to the application program unit 3200 of FIG. 3 or the embedded application module 2500 of FIG. 4, and a default output screen corresponds to a GUI-based visual output similarly to a general application.

Thereafter, the TUI module 51000 is executed in the computing device A according to the execution of the chat module 50000, so that an output signal for implementing a tactile screen of the tactile interface device 1000 corresponding to the screen of the computing device A is generated by the chat module 50000, and an input signal which is to be inputted to the chat module 50000 is generated from a user input inputted to the tactile interface device 1000.

In other words, the TUI module 51000 serves to convert input/output signals of the account management module 52000, the chat partner management module 53000, the chat room management module 54000, and the chat conducting module 55000, which constitute the chat module 50000, into a form inputted to and outputted from the tactile interface device 1000.

Figure 9:
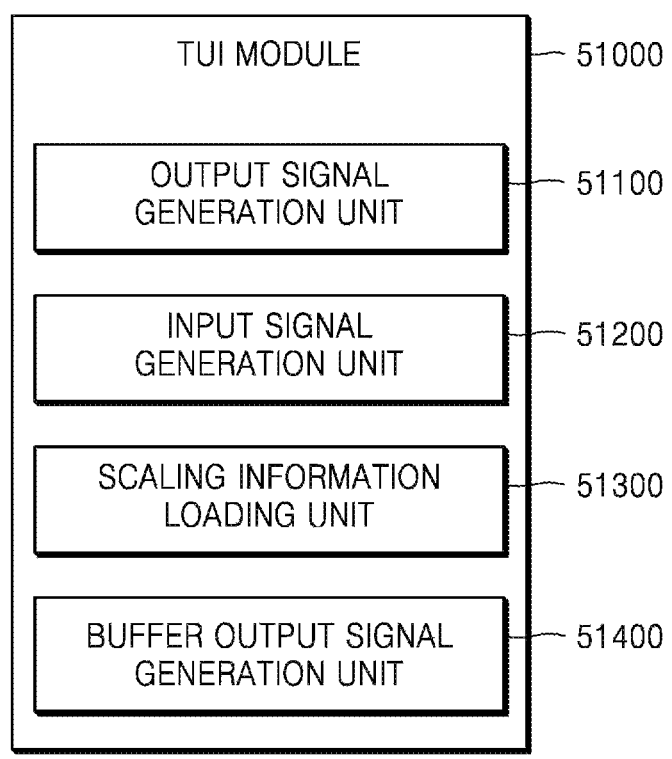
FIG. 9 is a view schematically showing an internal configuration of a TUI module of the chat module according to an embodiment of the present invention.

FIG. 9 is a view schematically showing an internal configuration of a TUI module of the chat module according to an embodiment of the present invention.

In detail, the TUI module 51000 of the chat module 50000 includes: an output signal generation unit 5110 for generating an output signal for implementing a tactile screen of the tactile display device 1000 corresponding to a screen of the computing device A by the main screen module 2200 or other applications; an input signal generation unit 5120 for generating an input signal by converting an input such as a key input in the tactile display device 1000 into a form which is inputted to the main screen module or other applications executed in the computing device A; a scaling information loading unit 5130 for loading scaling information suitable for pixels of a tactile display unit of a connected tactile interface device upon an operation of the output signal generation unit 5110; and a buffer output signal generation unit 5140 for generating a buffer output signal including a control signal for a two-dimensional tactile cell array having a variation based on the output signal and previous tactile display information of the tactile interface device 1000.

In this case, the output signal and the buffer output signal include the control signal for the two-dimensional tactile cell array.

Meanwhile, the scaling information loading unit 5130 preferably loads tactile display pixel information in such a manner that the tactile display pixel information of the tactile interface device is automatically received from the connected tactile interface device. Alternatively, the tactile display pixel information may be stored in the memory of the computing device.

The output signal generation unit 5110 generates an output signal for implementing a tactile screen of the tactile interface device corresponding to the screen of the computing device A. In this case, the output signal includes the control signal for the two-dimensional tactile cell array, and similar to the TUI module 2400 mounted in the braille OS unit 2000, as shown in FIG. 6, the tactile screen of the tactile display device which is implemented by the output signal includes: a content area L1 implemented based on a content part of the screen displayed on the computing device A by the main screen module 2200; a cursor area L2 for implementing a current position and a shape of a cursor of the user; and a page area L3 implemented based on page information of the screen displayed on the computing device by the main screen module 2200.

In addition, the tactile display device is provided with various physical keys, and each of the physical keys is assigned a function to perform a more intuitive function. An instruction of an application operating in the computing device may be generated by the TUI module by inputting the physical key, and the instruction may be inputted to the application operating in the computing device.

Figure 10:
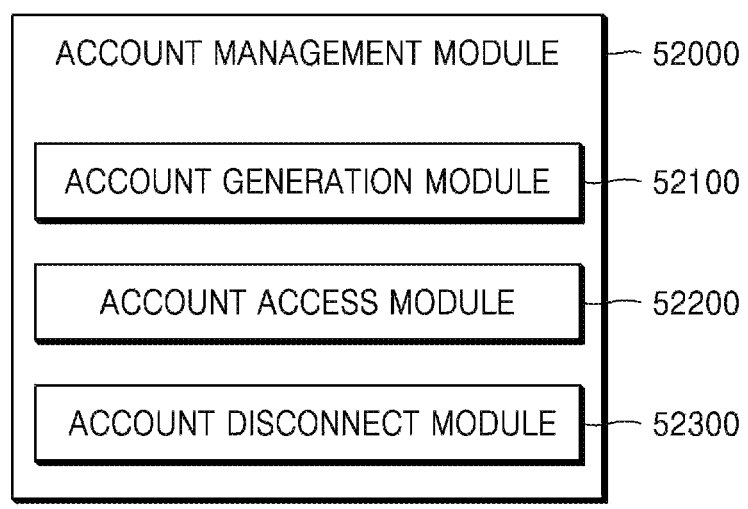
FIG. 10 is a view schematically showing an internal configuration of an account management module according to an embodiment of the present invention.

In addition, as shown in FIG. 10, the tactile screen of the tactile display device, which is implemented by the output signal generated by the TUI module 51000 of the chat module 50000, includes: a content area L1 implemented based on content parts of screens of the computing device A by the account management module 52000, the chat partner management module 53000, the chat room management module 54000, and the chat conducting module 55000; a cursor area L2 for implementing a current position and a shape of a cursor of the user; and a page area L3 implemented based on the page information of the screen displayed on the computing device by the main screen module 2200.

In addition, the content area may be divided into a plurality of sub-content areas, the cursor area may be divided into a plurality of sub-cursor areas, and a position of the cursor implemented in the cursor area preferably corresponds to a position of a focused sub-content area.

More preferably, the sub-cursor area and the sub-content area corresponding to the sub-content area are aligned on a single axis in the tactile graphic of the tactile interface device implemented by the TUI module 51000 of the chat module 50000. In such a structure, the visually impaired person may recognize a portion focused by the cursor of the visually impaired person most efficiently. This type of interface is obtained from various experiments conducted for the visually impaired person by the applicant of the present invention.

Meanwhile, the buffer output signal generation unit 5140 generates the buffer output signal from the output signal of the output signal generation unit 5110 which is generated based on the output signals of the account management module 52000, the chat partner management module 53000, the chat room management module 54000, and the chat conducting module 55000.

In this case, the output signal and the buffer output signal include the control signal for the two-dimensional tactile cell array.

Preferably, the TUI module 51000 of the chat module 50000 is executed every time the screen of the computing device A is changed by the account management module 52000, the chat partner management module 53000, the chat room management module 54000, and the chat conducting module 55000, and the buffer output signal is generated based on a difference between an immediately preceding output signal and a current changed output signal.

In detail, the TUI module 51000 of the chat module 50000 executes: loading a previous output signal generated by the output signal generation unit before the screen is changed by a current input of the user; calculating a difference between the previous output signal and a current output signal generated by the output signal generation unit after the screen is changed by the current input of the user; and generating a buffer output signal based on the difference between the current output signal and the previous output signal.

FIG. 10 is a view schematically showing an internal configuration of an account management module according to an embodiment of the present invention.

According to the embodiment, the account management module 52000 may include: an account generation module 52100 for generating the user account by registering a user authentication device of the user; an account access module 52200 for accessing the user account with the registered user authentication device; and an account disconnect module 52300 for disconnecting the accessed user account.

First, when the user executes the chat module 50000, the chat module 50000 executes the account generation module 52100 and the account access module 52200. In a case of a user having no generated user account, a user account may be generated by an operation of the account generation module 52100, and in a case of a user having a generated user account, the generated user account may be accessed by an operation of the account access module 52200.

In detail, the account generation module 52100 may generate the user account through the user authentication device which includes an e-mail account of the user, biometric authentication means including a fingerprint, iris, or the like, a certificate, a resident registration number, mobile phone authentication, and the like. The user may access the chat module 50000 through the user account generated as described above.

In addition, the account access module 52200 may access the user account with the registered user authentication device. When the user generates the user account through the e-mail account, the user may access the user account by inputting a password set in conjunction with the e-mail account. Alternatively, when the user generates the user account through the biometric authentication means including a fingerprint, iris, or the like, the user may access the user account by inputting the biometric authentication means to a biometric authentication device constituting the tactile interface device.

Meanwhile, the account disconnect module 52300 may disconnect the accessed user account. When the user ends the use of the chat module 50000, the user may disconnect the user account so as to protect personal information of the user including chat contents inputted in the chat module.

Hereinafter, operations of the account generation module 52100, the account access module 52200, and the account disconnect module 52300 constituting the account management module 52000 will be described.

Figure 11:
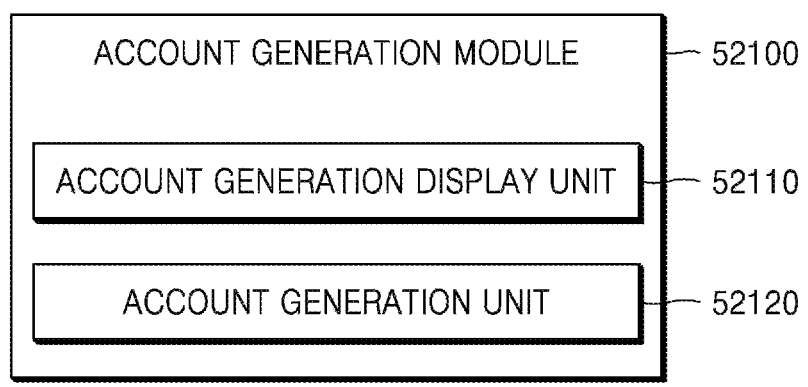
FIG. 11 is a view schematically showing an internal configuration of an account generation module according to an embodiment of the present invention.

FIG. 11 is a view schematically showing an internal configuration of an account generation module according to an embodiment of the present invention.

According to the embodiment, as described above, the account generation module 52100 operates when there is no generated user account of the user, and the account generation module 52100 includes an account generation display unit 52110 for displaying account generation display data for generating the user account of the user on the screen of the computing device.

According to an embodiment of the present invention, the screen of the computing device based on the account generation display data may include a screen for selecting one authentication device from user authentication devices. In addition, the screen of the computing device based on the account generation display data may further include a screen for inputting additional personal information of the user that is necessary for an operation of the chat module 50000.

The TUI module 51000 may generate an account generation output signal for implementing a tactile screen of the tactile interface device corresponding to a screen of the computing device A based on the account generation display data.

The account generation output signal may be implemented in the content area and can be implemented in one or more sub-content areas included in the content area.

The user may select the one or more sub-content areas in which the account generation output signal is implemented by one or more input selection cursor areas corresponding to the one or more sub-content areas in which the account generation output signal is implemented, and may select one authentication device among the above user authentication devices through the tactile interface device 1000 or input additional personal information of the user that is necessary for the operation of the chat module 50000.

An account generation unit 52120 may register the user authentication device for generating the user account which is to be inputted to the tactile interface device 1000, or may generate the user account based on additional user information for generating the user account.

Figure 12:
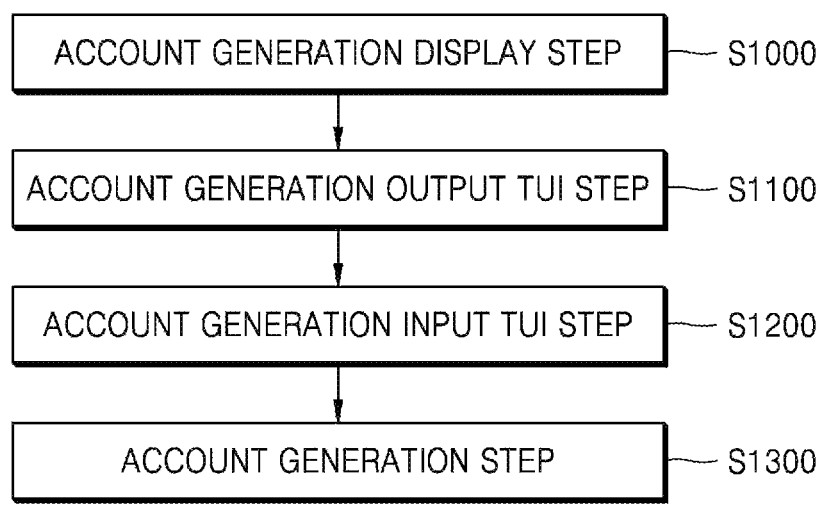
FIG. 12 is a view schematically showing detailed operations of the account generation module according to an embodiment of the present invention.

FIG. 12 is a view schematically showing detailed operations of the account generation module according to an embodiment of the present invention.

The detailed operations of the account generation module 52100 are the same as the above-described operations of the account generation module 52100.

According to the embodiment, the account generation module 52100 may perform an account generation display step S1000 of displaying the account generation display data for generating the user account of the user on the screen of the computing device A.

The TUI module 51000 may perform an account generation output TUI step S1100 of generating the account generation output signal for implementing a tactile screen of the tactile interface device corresponding to the screen of the computing device based on the account generation display data described above. The account generation output signal includes a control signal for a two-dimensional tactile cell array of the tactile interface device 1000.

The tactile screen of the tactile interface device 1000 implemented by the account generation output signal is implemented in the content area. The account generation output signal may be implemented in the one or more sub-content areas included in the content area.

In addition, the TUI module 51000 may perform an account generation input TUI step S1200 of generating an account generation input signal, which is to be inputted to the account generation unit, from a user input inputted to the tactile interface device 1000.

The account generation input signal may be selected by one or more input selection cursor areas corresponding to the one or more sub-content areas in which the account generation output signal is implemented to input data.

Figure 13:
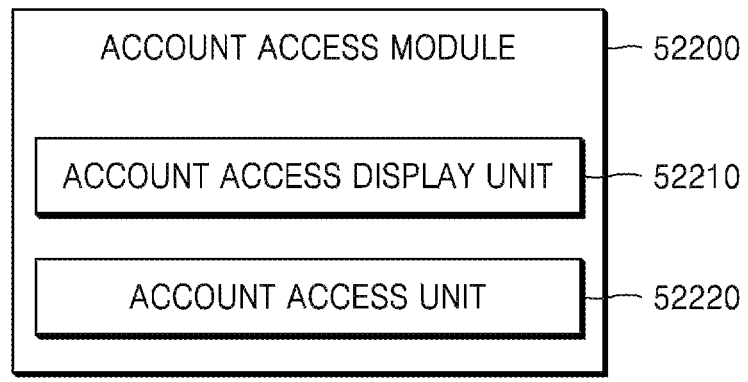
FIG. 13 is a view schematically showing an internal configuration of an account access module according to an embodiment of the present invention.

FIG. 13 is a view schematically showing an internal configuration of an account access module according to an embodiment of the present invention.

According to the embodiment, the account access module 52200 operates when a user account generated by the user exists, and the account access module 52200 may include: an account access display unit 52210 for displaying account access display data for accessing the generated user account of the user on the screen of the computing device; and an account access unit 52220 for accessing the user account with the registered user authentication device inputted to the tactile interface device 1000.

According to an embodiment of the present invention, the screen of the computing device based on the account access display data may include a screen for inputting the user authentication device including the e-mail account or the password. In addition, the screen of the computing device based on the account access display data may include a screen for accessing the chat module 50000 with the inputted user authentication device.

The TUI module 51000 may generate an account access output signal for implementing a tactile screen of the tactile interface device 1000 corresponding to a screen of the computing device A based on the account access display data.

The account access output signal may be implemented in the content area and can be implemented in one or more sub-content areas included in the content area.

The user may select the one or more sub-content areas in which the account access output signal is implemented by one or more input selection cursor areas corresponding to the one or more sub-content areas in which the account access output signal is implemented, and may input the user authentication device including the e-mail account and the password for accessing the user account through the tactile interface device 1000.

In other words, the account access unit 52220 my access the user account by the user authentication device inputted to the tactile interface device 1000.

Figure 14:
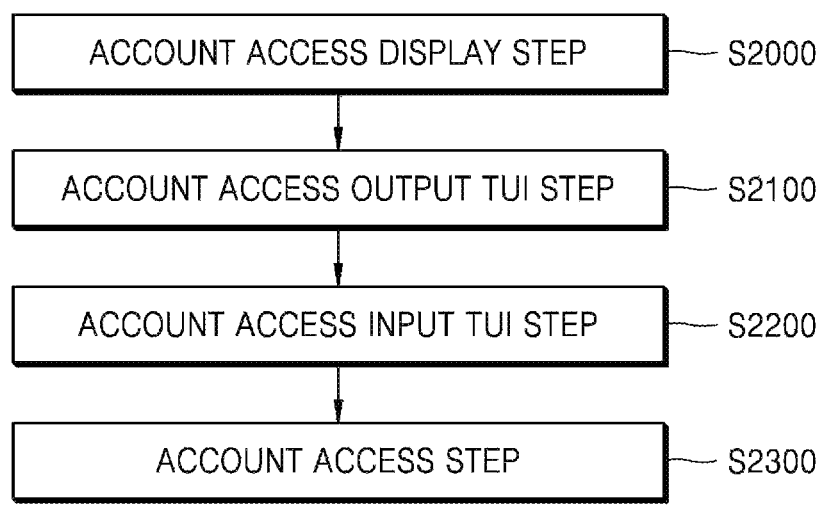
FIG. 14 is a view schematically showing detailed operations of the account access module according to an embodiment of the present invention.

FIG. 14 is a view schematically showing detailed operations of the account access module according to an embodiment of the present invention.

The detailed operations of the account access module 52200 are the same as the above-described operations of the account generation module 52100.

According to the embodiment, the account access module 52200 may perform an account access display step S2000 of displaying the account access display data for accessing the generated user account of the user on the screen of the computing device A.

The TUI module 51000 may perform an account access output TUI step S2100 of generating the account access output signal for implementing a tactile screen of the tactile interface device 1000 corresponding to the screen of the computing device A based on the account access display data described above. The account access output signal includes the control signal for the two-dimensional tactile cell array of the tactile interface device 1000.

The tactile screen of the tactile interface device 1000 implemented by the account access output signal is implemented in the content area. The account access output signal may be implemented in the one or more sub-content areas included in the content area.

In addition, the TUI module 51000 may perform an account access input TUI step S2200 of generating an account access input signal, which is to be inputted to the account access unit, from a user input inputted to the tactile interface device 1000.

The account access input signal may be selected by one or more input selection cursor areas corresponding to the one or more sub-content areas in which the account access output signal is implemented to input data.

Figure 15:
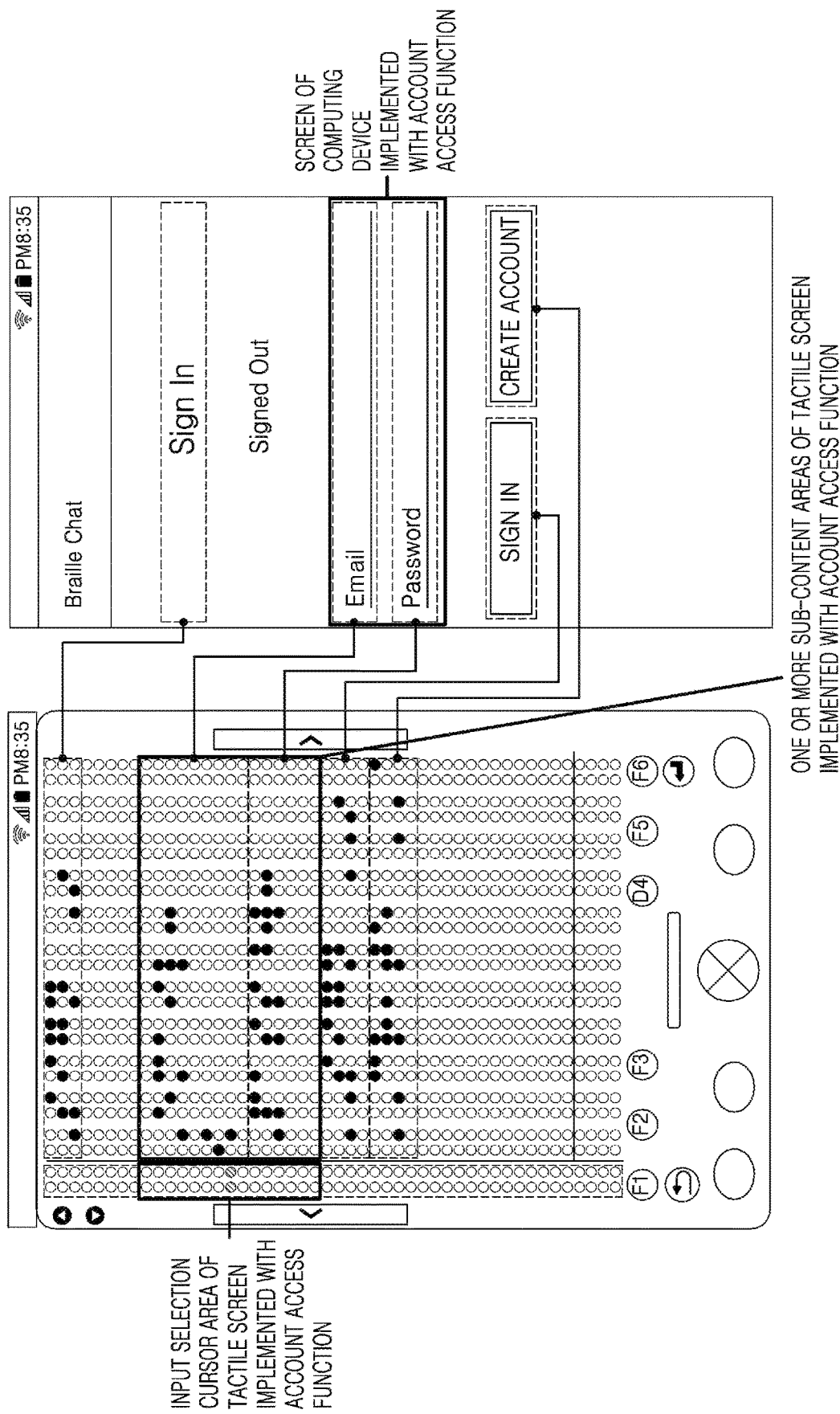
FIG. 15 is a view showing a screen of the tactile interface device in which the TUI module is executed with respect to a screen of the computing device according to an operation of the account access module according to an embodiment of the present invention.

FIG. 15 is a view showing a screen of the tactile interface device in which the TUI module is executed with respect to a screen of the computing device according to an operation of the account access module according to an embodiment of the present invention.

A left screen in FIG. 15 schematically shows the screen of the tactile interface device, and a right screen in FIG. 15 schematically shows a screen of the corresponding computing device.

In detail, the user may input the user authentication device including the e-mail account and the password through input selection cursor areas corresponding to the one or more sub-content areas, and may access the user account through the user authentication device including the e-mail account and the password.

Figure 16:
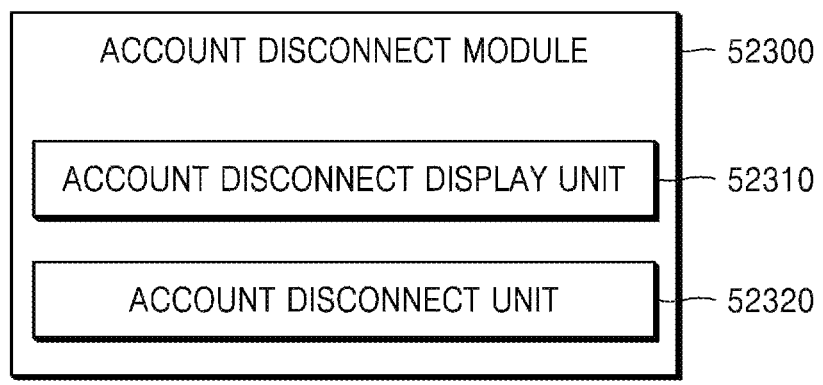
FIG. 16 is a view schematically showing an internal configuration of an account disconnect module according to an embodiment of the present invention.

FIG. 16 is a view schematically showing an internal configuration of an account disconnect module according to an embodiment of the present invention.

According to the embodiment, the account disconnect module 52300 may include: an account disconnect display unit 52310 for displaying account disconnect display data for disconnecting the accessed user account on the screen of the computing device; and an account disconnect unit 52320 for disconnecting the user account by a user input inputted to the tactile interface device.

According to an embodiment of the present invention, the screen of the computing device based on the account disconnect display data may include a screen for disconnecting the accessed user account.

The TUI module 51000 may generate an account disconnect output signal for implementing a tactile screen of the tactile interface device 1000 corresponding to a screen of the computing device A based on the account disconnect display data.

The account disconnect output signal may be implemented in the content area and can be implemented in one or more sub-content areas included in the content area.

The user may select the one or more sub-content areas in which the account disconnect output signal is implemented by one or more input selection cursor areas corresponding to the one or more sub-content areas in which the account disconnect output signal is implemented, and may perform input for disconnecting the user account through the tactile interface device 1000.

The account disconnect unit 52320 may disconnect the user account by an input of the tactile interface device 1000.

Figure 17:
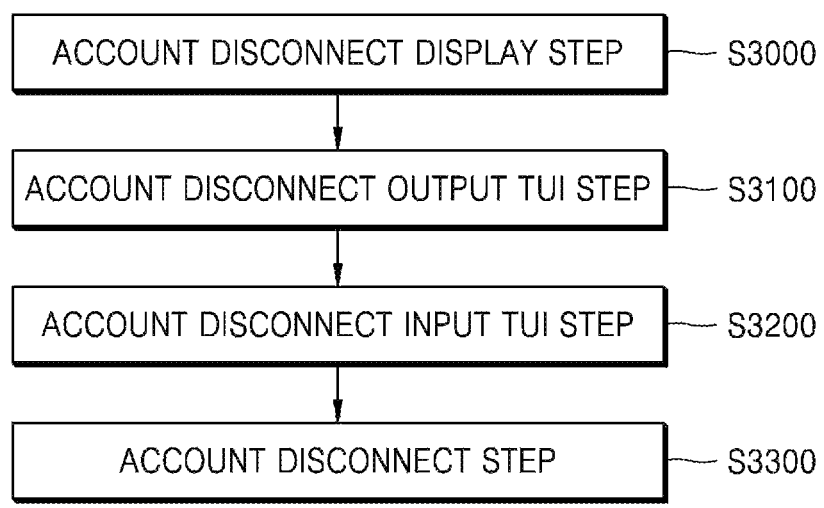
FIG. 17 is a view schematically showing detailed operations of the account disconnect module according to an embodiment of the present invention.

FIG. 17 is a view schematically showing detailed operations of the account disconnect module according to an embodiment of the present invention.

The detailed operations of the account disconnect module 52300 are the same as the above-described operations of the account generation module 52100.

According to the embodiment, the account disconnect module 52300 may perform an account disconnect display step S3000 of displaying the account disconnect display data for disconnecting the accessed user account on the screen of the computing device A.

The TUI module 51000 may perform an account disconnect output TUI step S3100 of generating the account disconnect output signal for implementing a tactile screen of the tactile interface device corresponding to the screen of the computing device based on the account disconnect display data described above. The account disconnect output signal includes the control signal for the two-dimensional tactile cell array of the tactile interface device 1000.

The tactile screen of the tactile interface device 1000 implemented by the account disconnect output signal is implemented in the content area. The account disconnect output signal may be implemented in the one or more sub-content areas included in the content area.

In addition, the TUI module 51000 may perform an account disconnect input TUI step S3200 of generating an account disconnect input signal, which is to be inputted to the account disconnect unit 52320, from a user input inputted to the tactile interface device 1000.

The account disconnect input signal may be selected by one or more input selection cursor areas corresponding to the one or more sub-content areas in which the account disconnect output signal is implemented to input data.

Figure 18:
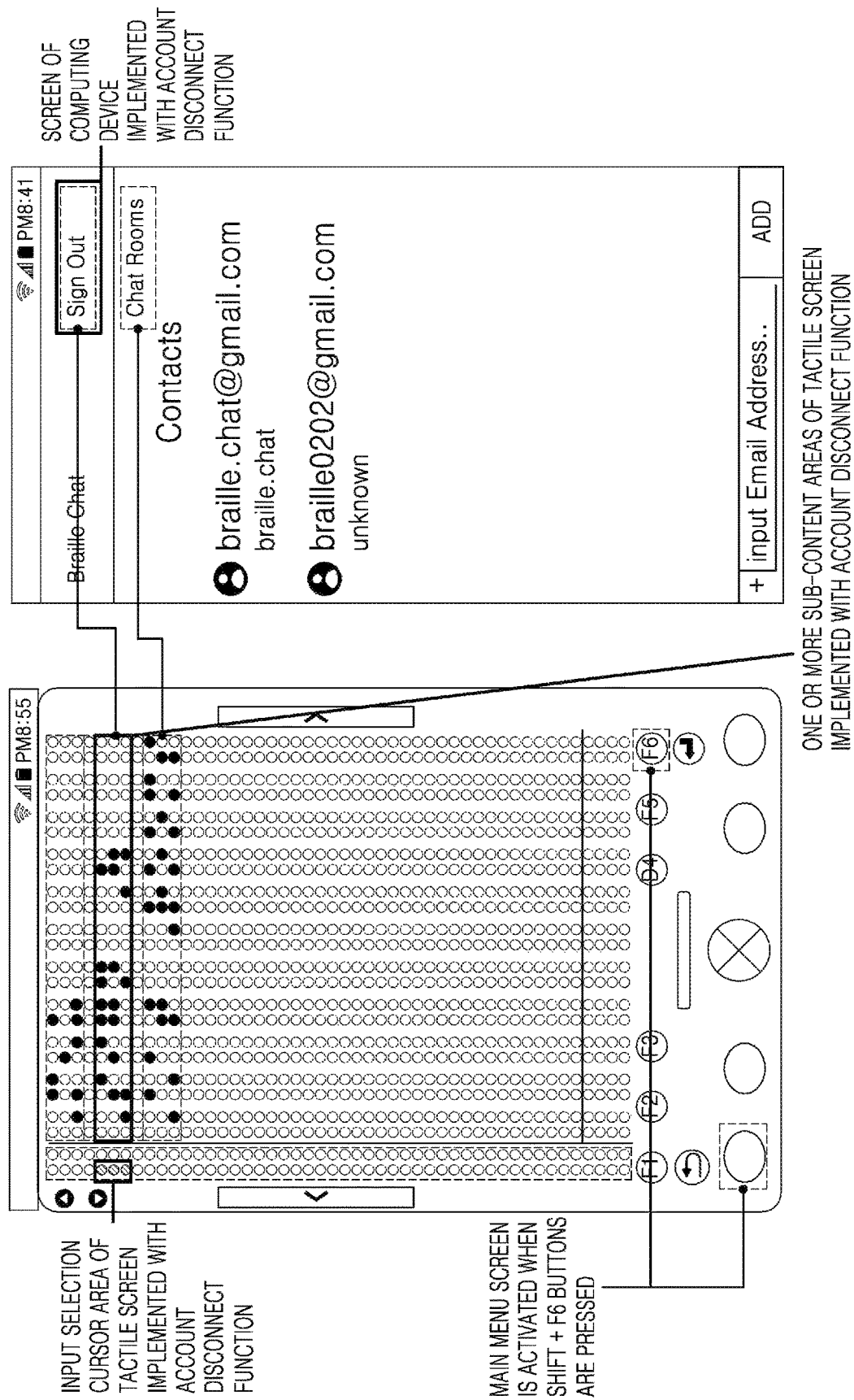
FIG. 18 is a view showing a screen of the tactile interface device in which the TUI module is executed with respect to a screen of the computing device according to an operation of an account disconnect module according to an embodiment of the present invention.

FIG. 18 is a view showing a screen of the tactile interface device in which the TUI module is executed with respect to a screen of the computing device according to an operation of an account disconnect module according to an embodiment of the present invention.

A left screen in FIG. 18 schematically shows the screen of the tactile interface device, and a right screen in FIG. 18 schematically shows a screen of the corresponding computing device.

FIG. 18 is a view illustrating a screen of the computing device A implemented based on the account disconnect display data by an operation of the account disconnect display unit 52310 of the account disconnect module 52300 according to an embodiment of the present invention.

In addition, FIG. 18 is a view illustrating the one or more sub-content areas implemented by the operation of the TUI module 51000 and the input selection cursor areas corresponding to the one or more sub-content areas according to an embodiment of the present invention.

In detail, the user may disconnect the accessed user account through the input selection cursor areas corresponding to the one or more sub-content areas.

Figure 19:
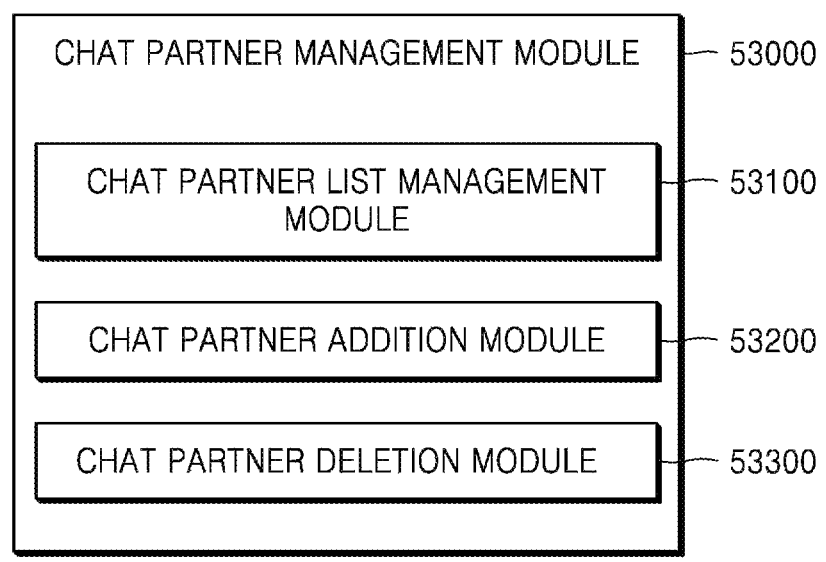
FIG. 19 is a view schematically showing an internal configuration of a chat partner management module according to an embodiment of the present invention.

FIG. 19 is a view schematically showing an internal configuration of a chat partner management module according to an embodiment of the present invention.

According to the embodiment, the chat partner management module 53000 may include: a chat partner list management module 53100 for managing a chat partner list including the one or more chat partners registered in the accessed user account; a chat partner addition module 53200 for adding a chat partner to the chat partner list by inputting a user account of the chat partner; and a chat partner deletion module 53300 for deleting one or more chat partners selected from the one or more chat partners included in the chat partner list.

First, when the user accesses the chat module 50000 through the user account, the user may manage the chat partner list including the one or more chat partners registered in the user account of the user through the chat partner list management module 53100.

In detail, the user may confirm the chat partner list including the one or more chat partners registered in the user account through the chat partner list management module 53100, and may generate a chat room shared with the chat room participants including the one or more chat partners registered in the user account and included in the chat partner list to conduct a chat or may delete the generated chat room where the chat room participants are present, as will be described below.

In addition, the chat partner addition module 53200 may add the chat partner to the chat partner list by inputting a user account of the chat partner. As a result, the user may add the chat partner to the chat partner list by inputting the user account of the chat partner with which the user desires to chat, and may select the chat partner added to the chat partner list during the access to the chat module 50000 to conduct the chat in the chat room.

Meanwhile, the chat partner deletion module 53300 may delete one or more chat partners selected from the one or more chat partners included in the chat partner list. In other words, when the user desires to delete the chat partner, which is added to the chat partner list, from the chat partner list, the user may delete the chat partner selected the chat partner deletion module 53300.

Hereinafter, operations of the chat partner list management module 53100, the chat partner addition module 53200, and the chat partner deletion module 53300 constituting the chat partner management module 53000 will be described.

Figure 20:
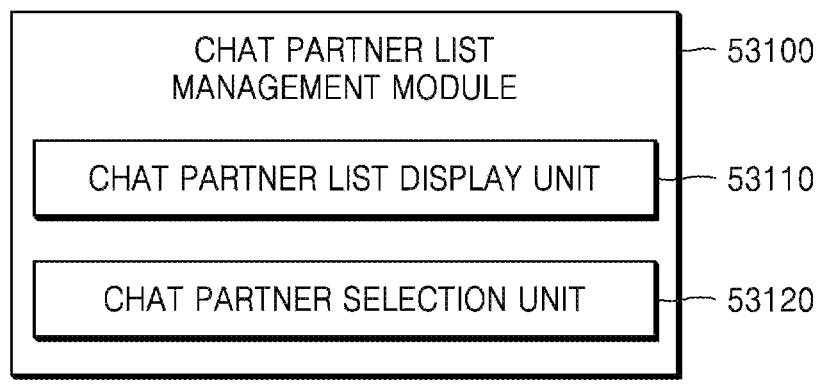
FIG. 20 is a view schematically showing an internal configuration of a chat partner list management module according to an embodiment of the present invention.

FIG. 20 is a view schematically showing an internal configuration of a chat partner list management module according to an embodiment of the present invention.

According to the embodiment, the chat partner list management module 53100 may include: a chat partner list display unit 53110 for displaying chat partner list display data for the chat partner list including the one or more chat partners on the screen of the computing device A; and a chat partner selection unit 53120 for selecting the one or more chat partners from the one or more chat partners included in the chat partner list by a user input inputted to the tactile interface device 1000.

According to an embodiment of the present invention, the screen of the computing device based on the chat partner list display data may include a screen for displaying the one or more chat partners included in the chat partner list.

The TUI module 51000 may generate a chat partner list output signal for implementing a tactile screen of the tactile interface device 1000 corresponding to a screen of the computing device A based on the chat partner list display data, and may generate a chat partner selection input signal, which is to be inputted to the chat partner selection unit 53200, from a user input inputted to the tactile interface device 1000.

The chat partner list output signal may be implemented in the content area and can be implemented in one or more sub-content areas included in the content area.

The user may select the one or more sub-content areas in which the chat partner list output signal is implemented by one or more input selection cursor areas corresponding to the one or more sub-content areas in which the chat partner list output signal is implemented, and may perform input to the chat partner list through the tactile interface device 1000.

Preferably, the one or more chat partners included in the chat partner list is implemented in the one or more sub-content areas included in the content area in which the chat partner list output signal is implemented, and the chat partner selection input signal is selected by one or more input selection cursor areas corresponding to the one or more sub-content areas in which the chat partner list output signal is implemented to input data.

In other words, the user may select the one or more chat partners by one or more input selection cursor areas corresponding to the one or more sub-content areas in which the one or more chat partners included in the chat partner list are implemented.

Figure 21:
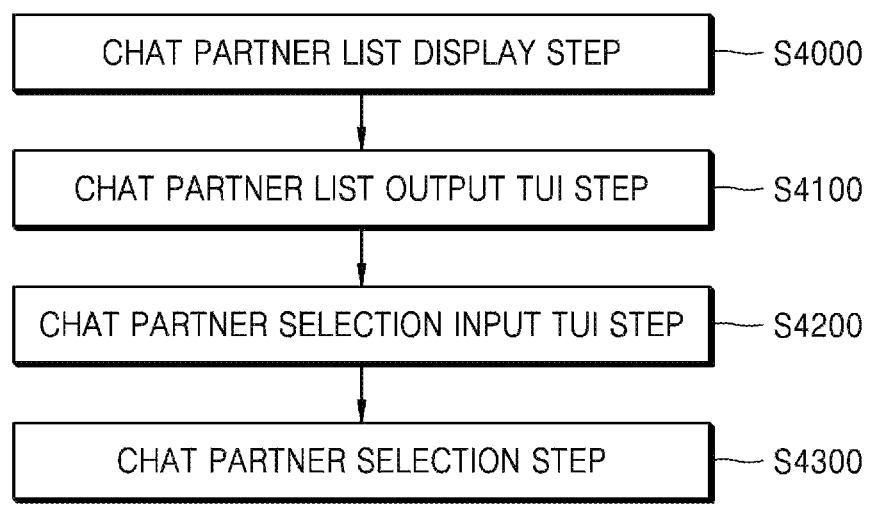
FIG. 21 is a view schematically showing detailed operations of the chat partner list management module according to an embodiment of the present invention.

The chat partner selection unit 53200 may select one or more chat partners among the one or more chat partners included in the chat partner list by an input of the tactile interface device 1000. FIG. 21 is a view schematically showing detailed operations of the chat partner list management module according to an embodiment of the present invention.

The detailed operations of the chat partner list management module 53100 are the same as the above-described operations of the chat partner list management module 53100.

According to the embodiment, the chat partner list management module 53100 may perform a chat partner list display step S4000 of displaying the chat partner list display data for the chat partner list including the one or more chat partners on the screen of the computing device A.

The TUI module 51000 may perform a chat partner list output TUI step S4100 of generating the chat partner list output signal for implementing a tactile screen of the tactile interface device 1000 corresponding to the screen of the computing device A based on the chat partner list display data described above. The chat partner list output signal includes the control signal for the two-dimensional tactile cell array of the tactile interface device 1000.

The tactile screen of the tactile interface device 1000 implemented by the chat partner list output signal is implemented in the content area. The chat partner list output signal may be implemented in the one or more sub-content areas included in the content area.

In addition, the TUI module 51000 may perform a chat partner selection input TUI step S4200 of generating a chat partner selection input signal, which is to be inputted to the chat partner list management unit, from a user input inputted to the tactile interface device 1000.

The chat partner selection input signal may be selected by one or more input selection cursor areas corresponding to the one or more sub-content areas in which the chat partner list output signal is implemented to input data.

Preferably, the one or more chat partners included in the chat partner list is implemented in the one or more sub-content areas included in the content area in which the chat partner list output signal is implemented, and the chat partner selection input signal is selected by one or more input selection cursor areas corresponding to the one or more sub-content areas in which the chat partner list output signal is implemented to input data.

Figure 22:
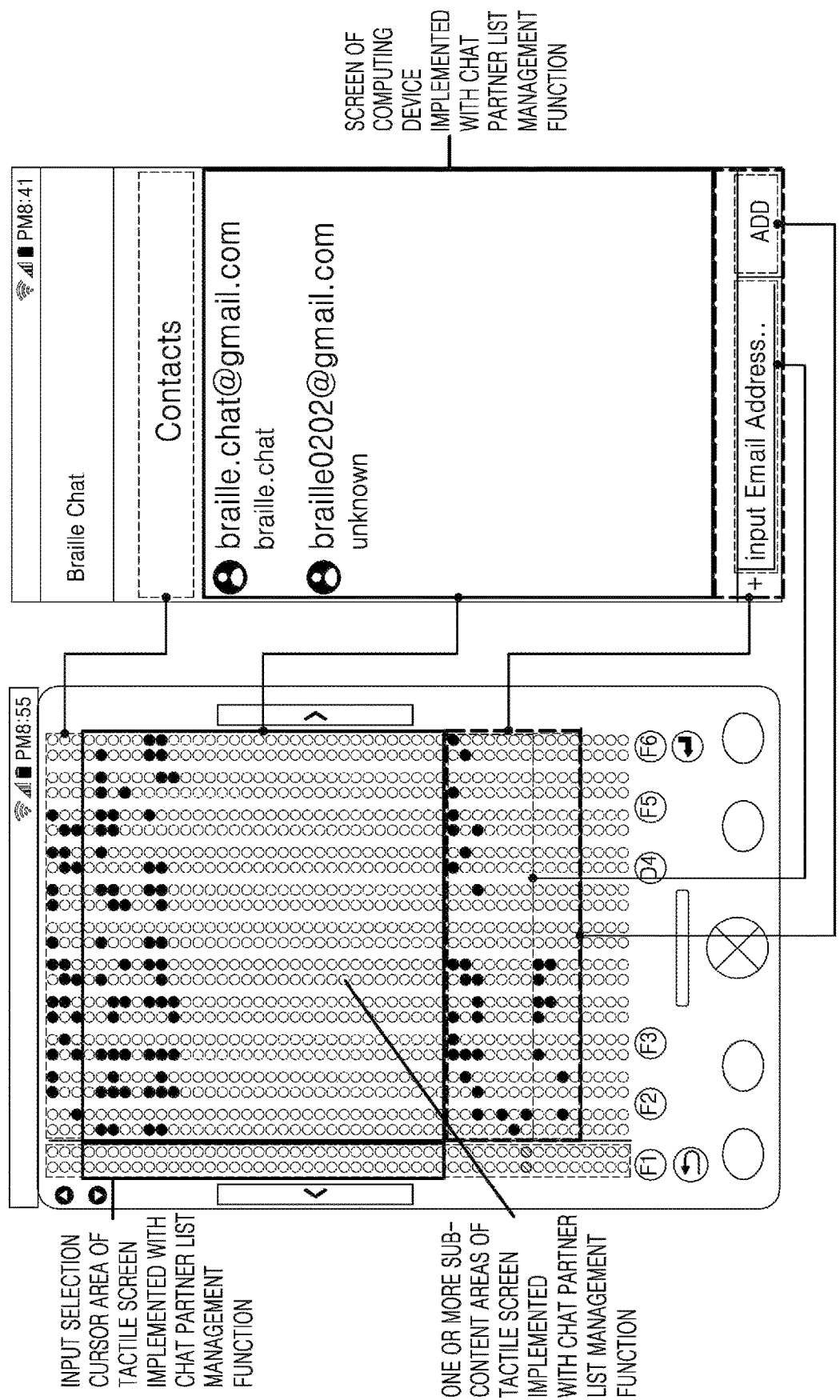
FIG. 22 is a view showing a screen of the tactile interface device in which the TUI module is executed with respect to a screen of the computing device according to an operation of the chat partner list management module according to an embodiment of the present invention.

FIG. 22 is a view showing a screen of the tactile interface device in which the TUI module is executed with respect to a screen of the computing device according to an operation of the chat partner list management module according to an embodiment of the present invention.

FIG. 22 is a view illustrating a screen of the computing device A implemented based on the chat partner list display data by an operation of the chat partner list display unit 53110 of the chat partner list management module 53000 according to an embodiment of the present invention.

A left screen in FIG. 22 schematically shows the screen of the tactile interface device, and a right screen in FIG. 22 schematically shows a screen of the corresponding computing device.

In addition, FIG. 22 is a view illustrating the one or more sub-content areas implemented by the operation of the TUI module 51000 and the input selection cursor areas corresponding to the one or more sub-content areas according to an embodiment of the present invention.

In detail, the user may confirm the chat partner list outputted in the one or more sub-content areas, and select one or more chat partners among the one or more chat partners included in the chat partner list through the input selection cursor area corresponding to the one or more sub-content areas.

Figure 23:
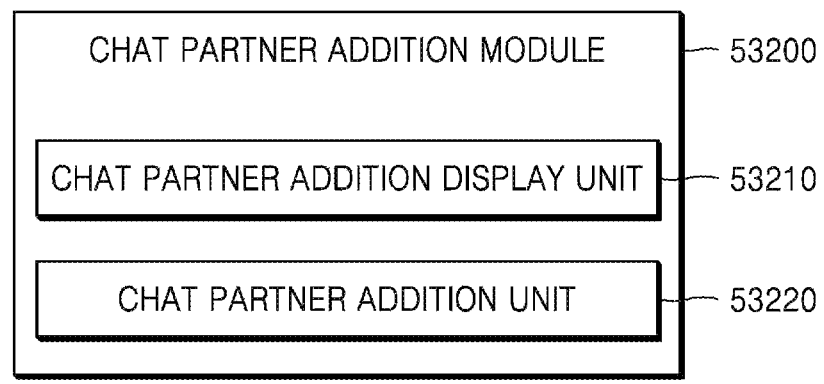
FIG. 23 is a view schematically showing an internal configuration of a chat partner addition module according to an embodiment of the present invention.

FIG. 23 is a view schematically showing an internal configuration of a chat partner addition module according to an embodiment of the present invention.

According to the embodiment, the chat partner addition module 53200 may include: a chat partner addition display unit 53210) for displaying chat partner addition display data for adding a chat partner to the chat partner list on the screen of the computing device; and a chat partner addition unit 53220 for adding the chat partner to the chat partner list based on the user account of the chat partner that is inputted to the tactile interface device.

According to an embodiment of the present invention, the screen of the computing device based on the chat partner addition display data may include a screen for adding a chat partner to the chat partner list.

The TUI module 51000 may generate a chat partner addition output signal for implementing a tactile screen of the tactile interface device 1000 corresponding to a screen of the computing device A based on the chat partner addition display data, and may generate a chat partner addition input signal, which is to be inputted to the chat partner addition unit 53200, from a user input inputted to the tactile interface device 1000.

The chat partner addition output signal may be implemented in the content area and can be implemented in one or more sub-content areas included in the content area.

The user may select the one or more sub-content areas in which the chat partner addition output signal is implemented by one or more input selection cursor areas corresponding to the one or more sub-content areas in which the chat partner addition output signal is implemented, and may input the user account of the chat partner to add the chat partner to the chat partner list through the tactile interface device 1000.

Figure 24:
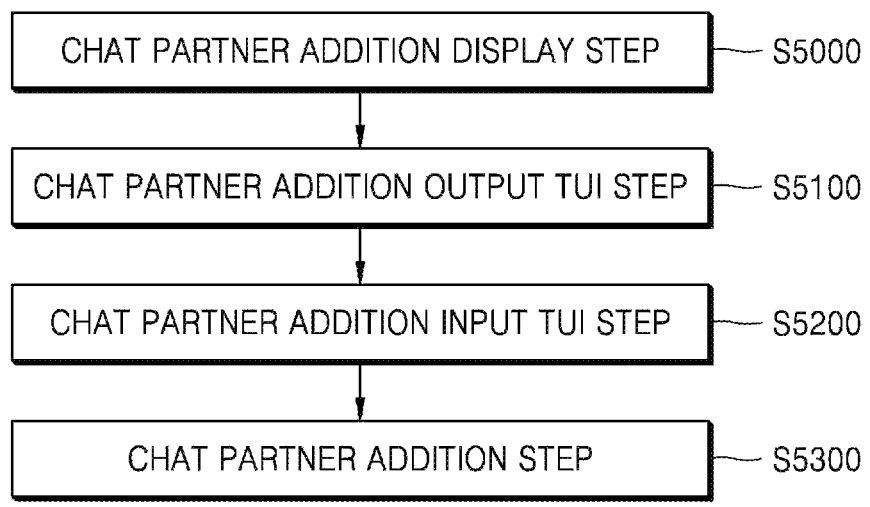
FIG. 24 is a view schematically showing detailed operations of the chat partner addition module according to an embodiment of the present invention.

FIG. 24 is a view schematically showing detailed operations of the chat partner addition module according to an embodiment of the present invention.

The detailed operations of the chat partner addition module 53200 are the same as the above-described operations of the chat partner list management module 53100.

According to the embodiment, the chat partner addition module 53200 may perform a chat partner addition display step S5000 of displaying the chat partner addition display data for adding the chat partner to the chat partner list on the screen of the computing device.

The TUI module 51000 may perform a chat partner addition output TUI step S5100 of generating the chat partner addition output signal for implementing a tactile screen of the tactile interface device 1000 corresponding to the screen of the computing device A based on the chat partner addition display data described above. The chat partner addition output signal includes the control signal for the two-dimensional tactile cell array of the tactile interface device 1000.

The tactile screen of the tactile interface device 1000 implemented by the chat partner addition output signal is implemented in the content area. The chat partner addition output signal may be implemented in the one or more sub-content areas included in the content area.

In addition, the TUI module 51000 may perform a chat partner addition input TUI step S5200 of generating a chat partner addition input signal, which is to be inputted to the chat partner addition unit, from a user input inputted to the tactile interface device 1000.

The chat partner addition input signal may be selected by one or more input selection cursor areas corresponding to the one or more sub-content areas in which the chat partner addition output signal is implemented to input data.

Figure 25:
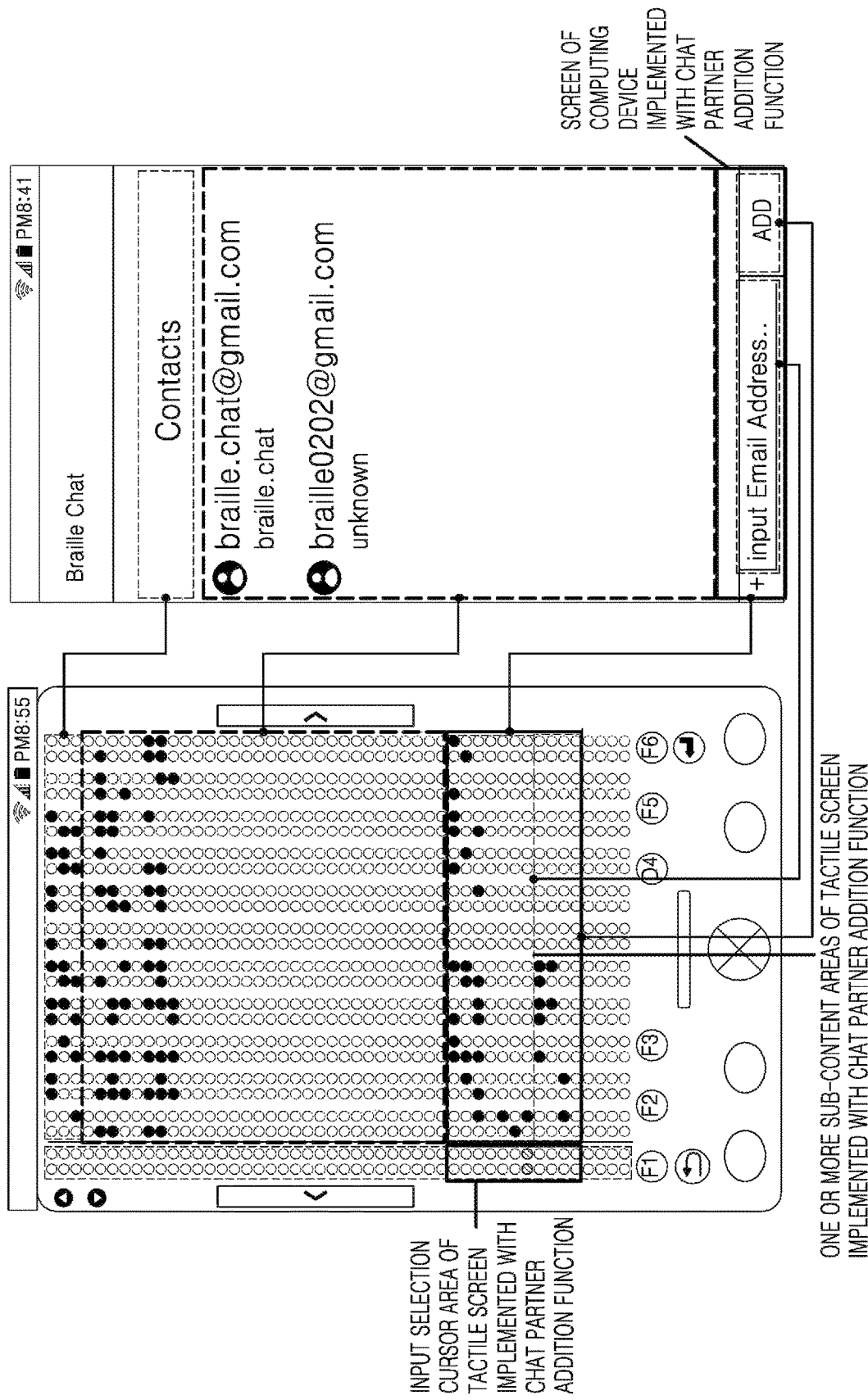
FIG. 25 is a view showing a screen of the tactile interface device in which the TUI module is executed with respect to a screen of the computing device according to an operation of the chat partner addition module according to an embodiment of the present invention.

FIG. 25 is a view showing a screen of the tactile interface device in which the TUI module is executed with respect to a screen of the computing device according to an operation of the chat partner addition module according to an embodiment of the present invention.

FIG. 25 is a view illustrating a screen of the computing device A implemented based on the chat partner addition display data by an operation of the chat partner addition display unit 53210 of the chat partner addition module 53200 according to an embodiment of the present invention.

A left screen in FIG. 25 schematically shows the screen of the tactile interface device, and a right screen in FIG. 25 schematically shows a screen of the corresponding computing device.

In addition, FIG. 25 is a view illustrating the one or more sub-content areas implemented by the operation of the TUI module 51000 and the input selection cursor areas corresponding to the one or more sub-content areas according to an embodiment of the present invention.

In detail, the user may add the chat partner to the chat partner list by inputting the user account of the chat partner through input selection cursor areas corresponding to the one or more sub-content areas.

Figure 26:
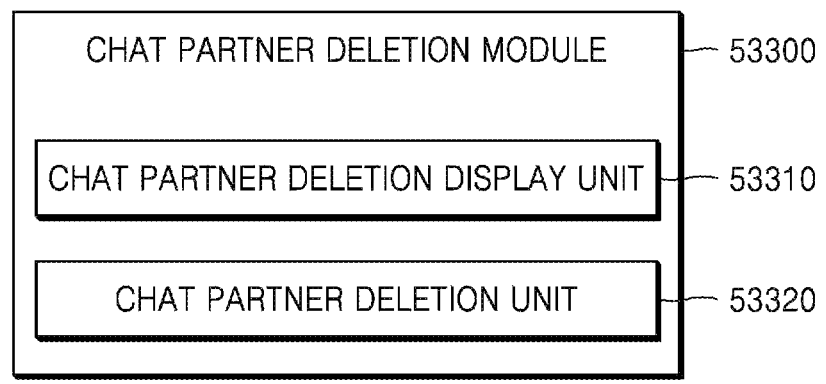
FIG. 26 is a view schematically showing an internal configuration of a chat partner deletion module according to an embodiment of the present invention.

FIG. 26 is a view schematically showing an internal configuration of a chat partner deletion module according to an embodiment of the present invention.

According to the embodiment, the chat partner deletion module 53300 may include: a chat partner deletion display unit 53310 for displaying chat partner deletion display data for deleting one or more chat partners selected by the chat partner list management module 53100 on the screen of the computing device A; and a chat partner deletion unit 53320 for deleting the one or more chat partners selected by the chat partner list management module 53100 based on a user input inputted to the tactile interface 1000.

According to an embodiment of the present invention, the screen of the computing device A based on the chat partner deletion display data may include a screen for deleting the one or more chat partners selected by the chat partner list management module 53100.

The TUI module 51000 may generate a chat partner deletion output signal for implementing a tactile screen of the tactile interface device 1000 corresponding to a screen of the computing device A based on the chat partner deletion display data, and may generate a chat partner deletion input signal, which is to be inputted to the chat partner deletion unit 53320, from a user input inputted to the tactile interface device 1000.

The chat partner deletion output signal may be implemented in the one or more sub-content areas included in the content area in which the chat partner list output signal is implemented, and the chat partner deletion input signal may be selected by one or more input selection cursor areas corresponding to the one or more sub-content areas in which the chat partner deletion output signal is implemented to input data.

The user may select the one or more sub-content areas in which the chat partner deletion output signal is implemented by one or more input selection cursor areas corresponding to the one or more sub-content areas in which the chat partner deletion output signal is implemented, and may delete one or more chat partners among the one or more chat partners included in the chat partner list through the tactile interface device 1000.

Figure 27:
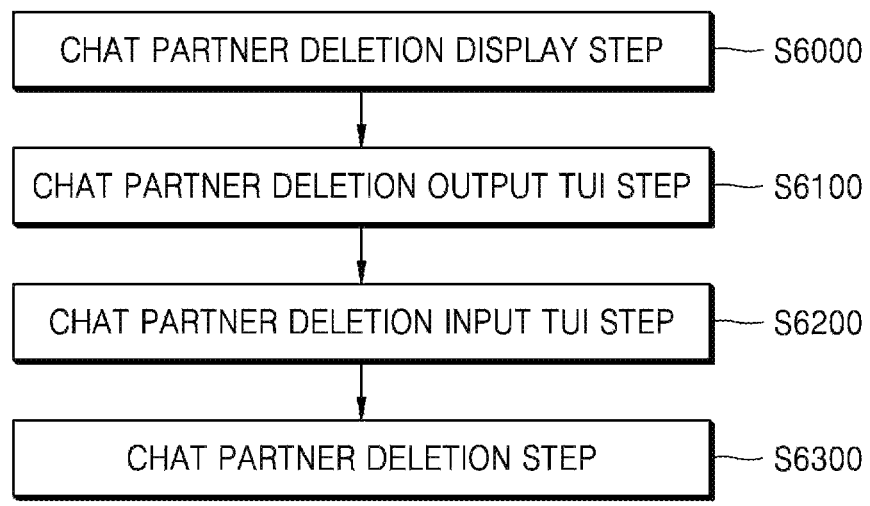
FIG. 27 is a view schematically showing detailed operations of the chat partner deletion module according to an embodiment of the present invention.

FIG. 27 is a view schematically showing detailed operations of the chat partner deletion module according to an embodiment of the present invention.

The detailed operations of the chat partner deletion module 53300 are the same as the above-described operations of the chat partner list management module 53100.

According to the embodiment, the chat partner deletion module 53200 may perform a chat partner deletion display step S6000 of displaying the chat partner deletion display data for deleting the one or more chat partners selected by the chat partner list management module 53100 on the screen of the computing device A.

The TUI module 51000 may perform a chat partner deletion output TUI step S6100 of generating the chat partner deletion output signal for implementing a tactile screen of the tactile interface device 1000 corresponding to the screen of the computing device A based on the chat partner deletion display data described above. The chat partner deletion output signal includes the control signal for the two-dimensional tactile cell array of the tactile interface device 1000.

The tactile screen of the tactile interface device 1000 implemented by the chat partner deletion output signal is implemented in the content area. The chat partner deletion output signal may be implemented in the one or more sub-content areas included in the content area.

In addition, the TUI module 51000 may perform a chat partner deletion input TUI step S6200 of generating a chat partner deletion input signal, which is to be inputted to the chat partner deletion unit, from a user input inputted to the tactile interface device 1000.

The chat partner deletion input signal may be selected by one or more input selection cursor areas corresponding to the one or more sub-content areas in which the chat partner deletion output signal is implemented to input data.

Figure 28:
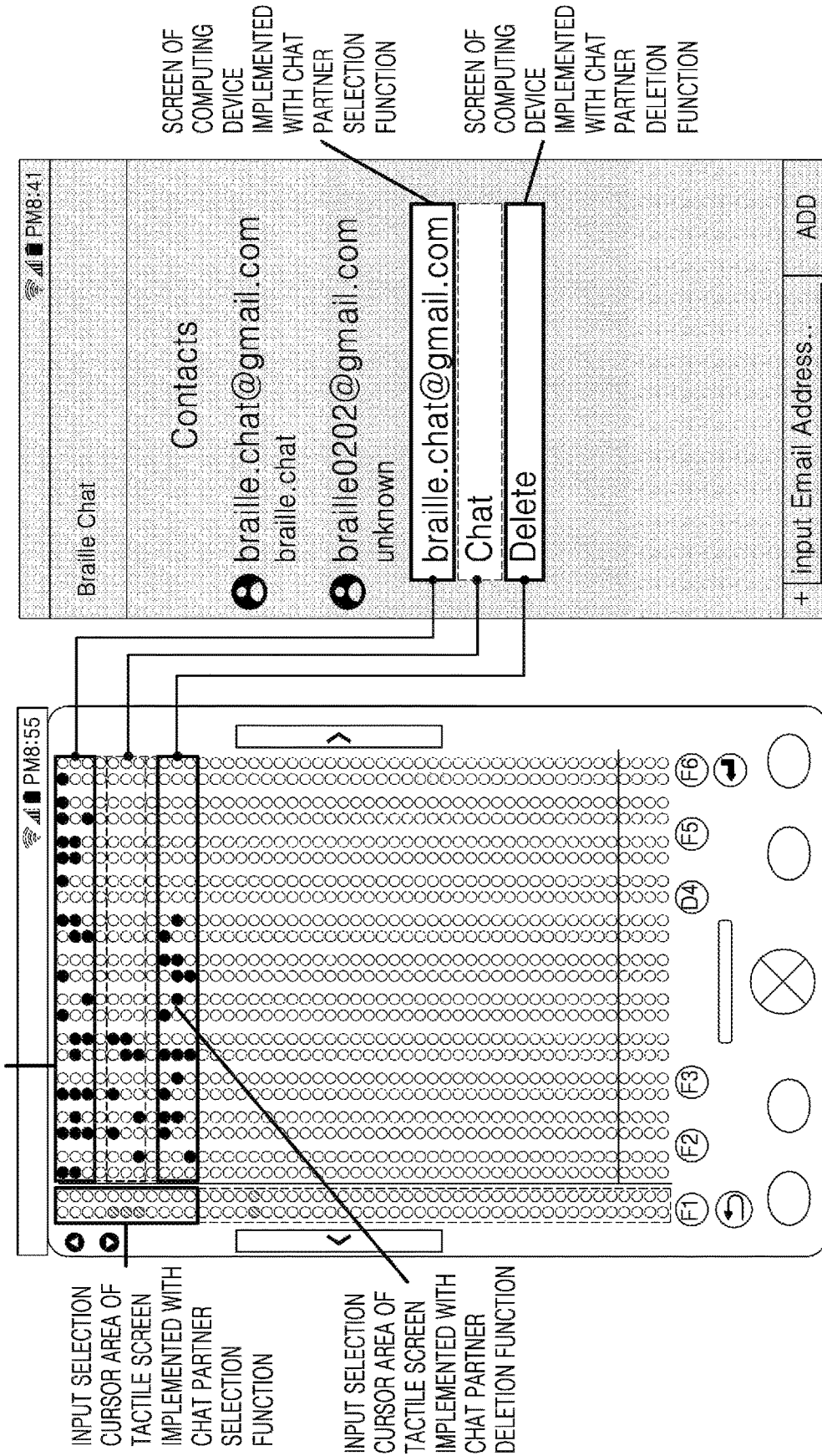
FIG. 28 is a view showing a screen of the tactile interface device in which the TUI module is executed with respect to a screen of the computing device according to an operation of the chat partner deletion module according to an embodiment of the present invention.

FIG. 28 is a view showing a screen of the tactile interface device in which the TUI module is executed with respect to a screen of the computing device according to an operation of the chat partner deletion module according to an embodiment of the present invention.

FIG. 28 is a view illustrating a screen of the computing device A implemented based on the chat partner deletion display data by an operation of the chat partner deletion display unit 53310 of the chat partner deletion module 53300 according to an embodiment of the present invention.

A left screen in FIG. 28 schematically shows the screen of the tactile interface device, and a right screen in FIG. 28 schematically shows a screen of the corresponding computing device.

In addition, FIG. 28 is a view illustrating the one or more sub-content areas implemented by the operation of the TUI module 51000 and the input selection cursor areas corresponding to the one or more sub-content areas according to an embodiment of the present invention.

In detail, the user may delete the one or more chat partners selected by the chat partner list management module 53100 through the input selection cursor areas corresponding to the one or more sub-content areas.

Figure 29:
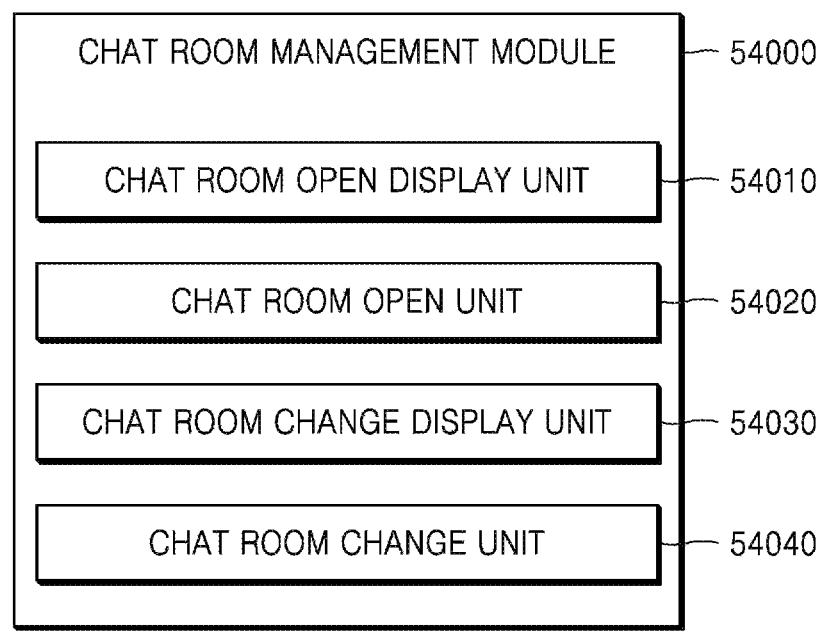
FIG. 29 is a view schematically showing an internal configuration of a chat room management module according to an embodiment of the present invention.

FIG. 29 is a view schematically showing an internal configuration of a chat room management module according to an embodiment of the present invention.

According to the embodiment, the chat room management module 54000 performs different functions depending on whether a previously opened chat room, which is shared with the chat room participants including the one or more chat partners selected by the chat partner list management module 53100, exists.

When there is no previously opened chat room shared with the chat room participants including the one or more selected chat partners, the chat room management module 54000 may include: a chat room open display unit 54010 for displaying chat room open display data for opening the chat room shared with the chat room participants including the one or more chat partners, which are selected by the chat partner list management module 53100, on the screen of the computing device A; and a chat room open unit 54020 for opening the chat room where the chat participants are present by a user input inputted to the tactile interface device 1000.

According to an embodiment of the present invention, the screen of the computing device A based on the chat room open display data may include a screen for opening the chat room shared with the chat room participants including the one or more chat partners selected by the chat partner list management module 53100.

The TUI module 51000 may generate a chat room open output signal for implementing a tactile screen of the tactile interface device 1000 corresponding to a screen of the computing device A based on the chat room open display data, and may generate a chat room open input signal, which is to be inputted to the chat room open unit 54020, from a user input inputted to the tactile interface device 1000. The chat room open output signal may be implemented in the one or more sub-content areas included in the content area in which the chat partner list output signal is implemented, and the chat room open input signal may be selected by one or more input selection cursor areas corresponding to the one or more sub-content areas in which the chat room open output signal is implemented to input data.

The user may open the chat room shared with the chat room participants including the one or more chat partners included in the chat partner list through the tactile interface device 1000 by one or more input selection cursor areas corresponding to the one or more sub-content areas in which the chat room open output signal is implemented.

Meanwhile, when the previously opened chat room shared with the chat room participants including the one or more selected chat partners exists, the chat room management module 54000 may include: a chat room change display unit 54030 for displaying chat room change display data for changing the chat room to the previously opened chat room on the screen of the computing device; and a chat room change unit 54040 for changing the chat room to the previously opened chat room by a user input inputted to the tactile interface device.

According to an embodiment of the present invention, the screen of the computing device A based on the chat room change display data may include a screen for changing the chat room to the chat room shared with the chat room participants including the one or more chat partners selected by the chat partner list management module 53100.

The TUI module 51000 may generate a chat room change output signal for implementing a tactile screen of the tactile interface device 1000 corresponding to a screen of the computing device A based on the chat room change display data and may generate a chat room change input signal, which is to be inputted to the chat room change unit 54040, from the user input inputted to the tactile interface device 1000. The chat room change output signal may be implemented in the one or more sub-content areas included in the content area in which the chat partner list output signal is implemented, and the chat room change input signal may be selected by one or more input selection cursor areas corresponding to the one or more sub-content areas in which the chat room change output signal is implemented to input data.

The user may change the chat room to the previously opened chat room shared with the chat room participants including the one or more chat partners included in the chat partner list through the tactile interface device 1000 by one or more input selection cursor areas corresponding to the one or more sub-content areas in which the chat room change output signal is implemented.

Figure 30:
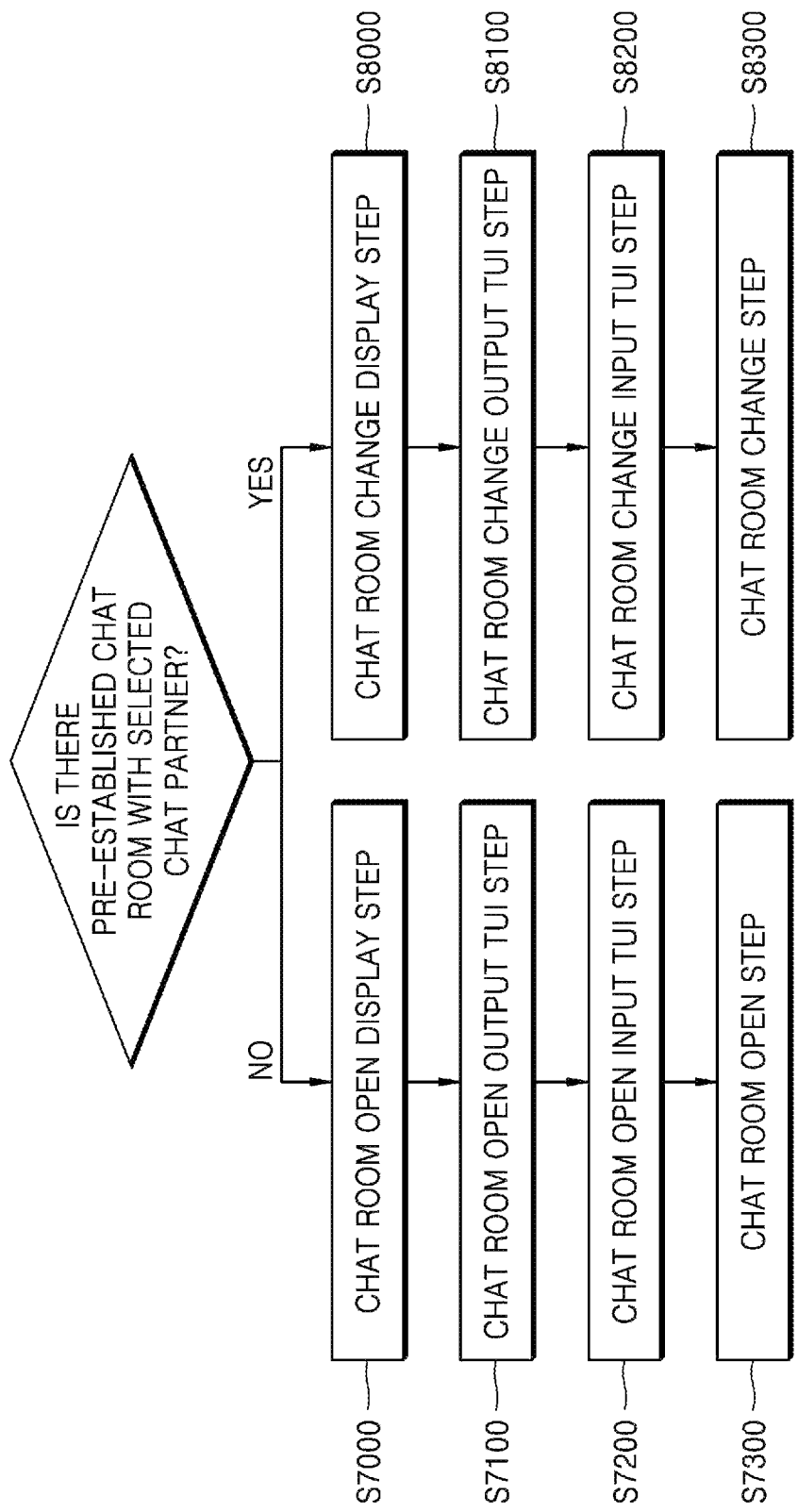
FIG. 30 is a view schematically showing detailed operations of the chat room management module according to an embodiment of the present invention.

FIG. 30 is a view schematically showing detailed operations of the chat room management module according to an embodiment of the present invention.

The detailed operations of the chat room management module 54000 are the same as the above-described operations of the chat room management module 54000.

In other words, the chat room management module 54000 performs different detailed functions depending on whether the previously opened chat room, which is shared with the chat room participants including the one or more chat partners selected by the chat partner list management module 53100, exists.

According to the embodiment, the chat room management module 54000 may perform a chat room open display step S7000 of displaying chat room open display data for opening the chat room shared with the chat room participants including the one or more chat partners, which are selected by the chat partner list management module 53100, on the screen of the computing device A when there is no previously opened chat room shared with the chat room participants including the one or more chat partners selected by the chat partner list management module 53100.

The TUI module 51000 may perform a chat room open output TUI step S7100 of generating the chat room open output signal for implementing a tactile screen of the tactile interface device 1000 corresponding to the screen of the computing device A based on the chat room open display data described above. The chat room open output signal includes the control signal for the two-dimensional tactile cell array of the tactile interface device 1000.

The tactile screen of the tactile interface device 1000 implemented by the chat room open output signal is implemented in the content area. The chat room open output signal may be implemented in the one or more sub-content areas included in the content area.

In addition, the TUI module 51000 may perform a chat room open input TUI step S7200 of generating a chat room open input signal, which is to be inputted to the chat room open unit, from a user input inputted to the tactile interface device 1000.

The chat room open input signal may be selected by one or more input selection cursor areas corresponding to the one or more sub-content areas in which the chat room open output signal is implemented to input data.

Meanwhile, the chat room management module 54000 may perform a chat room change display step S8000 of displaying the chat room change display data for changing the chat room to a previously opened chat room on the screen of the computing device A when the previously opened chat room shared with the chat room participants including the one or more chat partners selected by the chat partner list management module 53100 exists.

The TUI module 51000 may perform a chat room change output TUI step S8100 of generating the chat room change output signal for implementing a tactile screen of the tactile interface device 1000 corresponding to the screen of the computing device A based on the chat room change display data described above. The chat room change output signal includes the control signal for the two-dimensional tactile cell array of the tactile interface device 1000.

The tactile screen of the tactile interface device 1000 implemented by the chat room change output signal is implemented in the content area. The chat room change output signal may be implemented in the one or more sub-content areas included in the content area.

In addition, the TUI module 51000 may perform a chat room change input TUI step S8200 of generating a chat room change input signal, which is to be inputted to the chat room change unit, from a user input inputted to the tactile interface device 1000.

The chat room change input signal may be selected by one or more input selection cursor areas corresponding to the one or more sub-content areas in which the chat room change output signal is implemented to input data.

Figure 31:
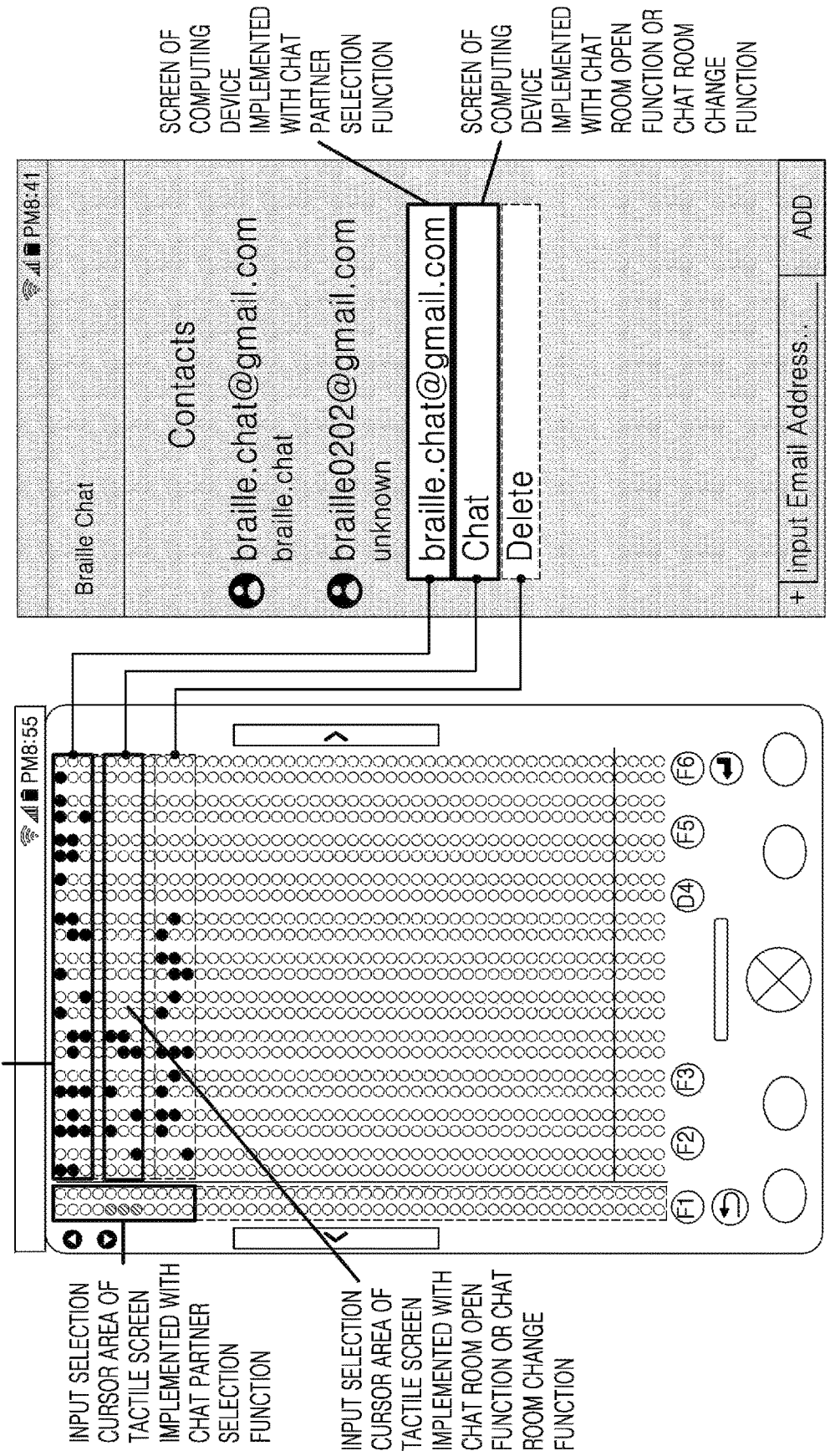
FIG. 31 is a view showing a screen of the tactile interface device in which the TUI module is executed with respect to a screen of the computing device according to an operation of the chat room management module according to an embodiment of the present invention.

FIG. 31 is a view showing a screen of the tactile interface device in which the TUI module is executed with respect to a screen of the computing device according to an operation of the chat room management module according to an embodiment of the present invention.

FIG. 31 is a view illustrating a screen of the computing device A implemented by an operation of the chat room open display unit 54010 or the chat room change display unit 54030 of the chat room management module 54000 according to an embodiment of the present invention.

In addition, FIG. 31 is a view illustrating the one or more sub-content areas implemented by the operation of the TUI module 51000 and the input selection cursor areas corresponding to the one or more sub-content areas according to an embodiment of the present invention.

In detail, the user may open a chat room shared with the chat room participants including the one or more chat partners selected by the chat partner list management module 53100 or change the chat room to the previously opened chat room through the input selection cursor areas corresponding to the one or more sub-content areas.

Figure 32:
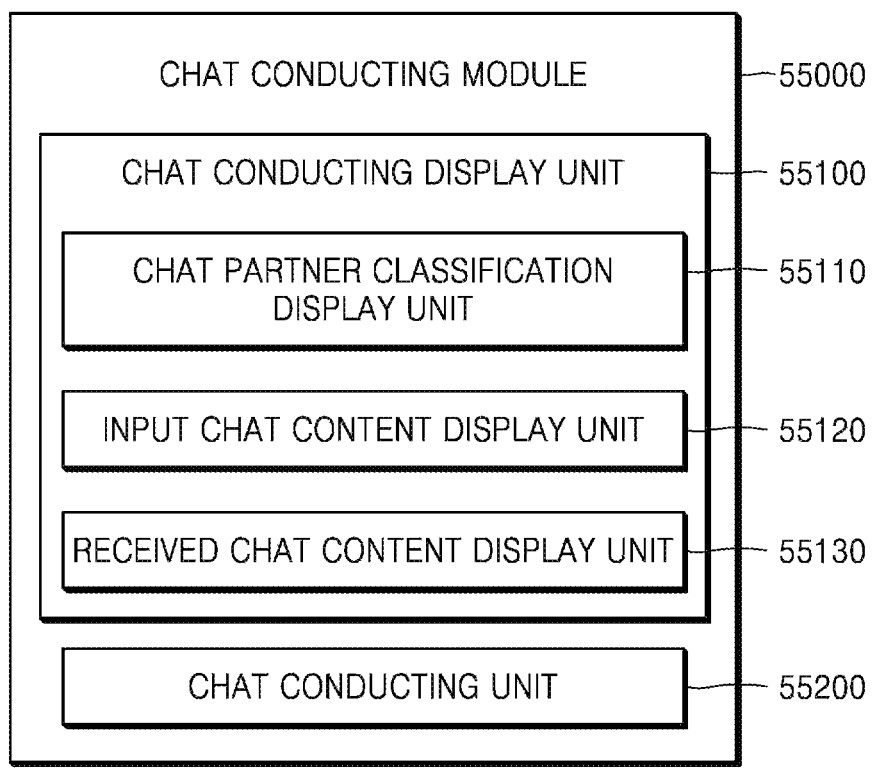
FIG. 32 is a view schematically showing an internal configuration of a chat conducting module according to an embodiment of the present invention.

FIG. 32 is a view schematically showing an internal configuration of a chat conducting module according to an embodiment of the present invention.

According to the embodiment, the chat conducting module 55000 includes: a chat conducting display unit 55100 for displaying chat conducting display data for conducting the chat with the chat room participants in the chat room, which is opened by the chat room management module or changed, on the screen of the computing device; and a chat conducting unit 55200 for transmitting a chat content of the user inputted to the tactile interface device to the chat participants and receiving chat contents inputted by the chat participants.

the chat conducting display unit 55100 includes: a chat partner classification display unit 55110 for displaying chat partner classification display data to identify the user and the chat room participants who input the chat contents in the chat room on the screen of the computing device; an input chat content display unit 55120 for displaying input chat content display data for the chat content of the user inputted to the tactile interface device on the screen of the computing device; and a received chat content display unit 55130 for displaying received chat content display data for the received chat contents inputted by the chat participants on the screen of the computing device.

The TUI module generates a chat conducting output signal including a chat partner classification output signal, an input chat content output signal, and a received chat content output signal to implement a tactile screen of the tactile interface device corresponding to a screen of the computing device based on the chat conducting display data including the chat partner classification display data, the input chat content display data, and the received chat content display data, and generates a chat conducting input signal including the chat content of the user, which is to be inputted to the chat conducting unit, from a user input inputted to the tactile interface device.

The chat conducting output signal is implemented in the content area.

The input chat content output signal and the received chat content output signal are implemented in the one or more sub-content areas constituting the content area in which the chat conducting output signal is implemented.

The chat partner classification output signal is implemented in the chat partner classification cursor area which is the one or more sub-cursor areas corresponding to the one or more sub-content areas.

The one or more sub-content areas in which the input chat content output signal and the received chat content output signal are implemented are classified by one or more chat partner classification cursor areas corresponding to the one or more sub-content areas.

The chat partner classification cursor areas identify the user and the chat room participants by mutually different braille outputs of the tactile interface device.

Figure 33:
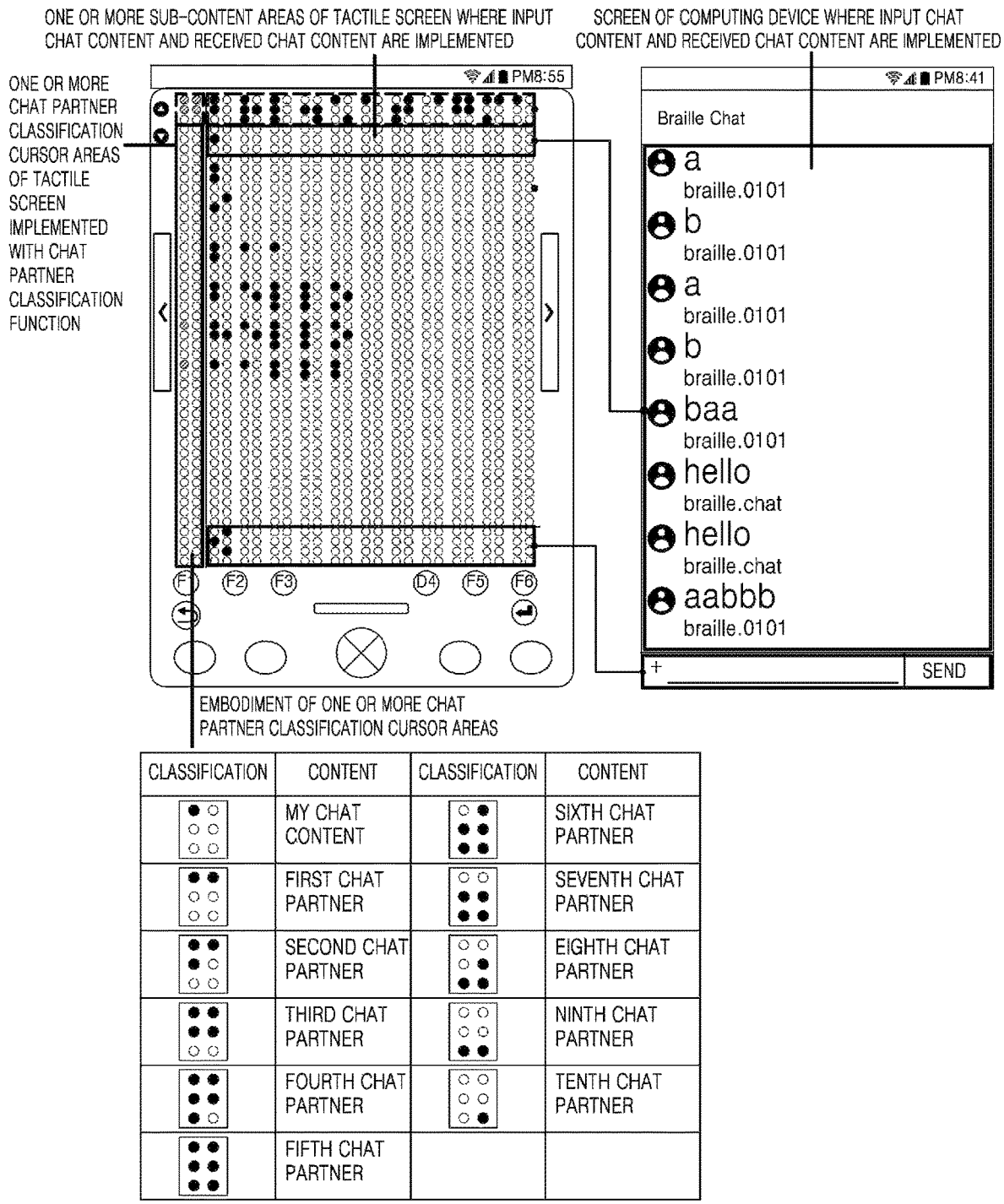
FIG. 33 is a view showing a screen of the tactile interface device in which the TUI module is executed with respect to a screen of the computing device according to an operation of the chat conducting module according to an embodiment of the present invention.

FIG. 33 is a view showing a screen of the tactile interface device in which the TUI module is executed with respect to a screen of the computing device according to an operation of the chat conducting module according to an embodiment of the present invention.

FIG. 33 is a view illustrating a screen of the computing device A implemented based on the chat conducting display data by an operation of the chat conducting display unit 55100 of the chat conducting module 55000 according to an embodiment of the present invention.

In addition, FIG. 33 is a view illustrating the one or more sub-content areas implemented by the operation of the TUI module 51000 and chat partner classification cursor areas corresponding to the one or more sub-content areas according to an embodiment of the present invention.

According to an embodiment of the present invention, the user may identify a person who inputs a chat displayed on the sub-content areas by a braille output or a tactile graphic icon displayed on the one or more chat partner classification cursor areas corresponding to the one or more sub-content areas.

Preferably, the chat conducting module 55000 may further include: a chat room participant list display unit for displaying chat room participant list display data for a chat room participant list including the chat room participants on the screen of the computing device, the TUI module 51000 may generate a chat room participant list output signal for implementing a tactile screen of the tactile interface device corresponding to a screen of the computing device based on the chat room participant list display data, the chat room participant list output signal may be implemented in the content area and can be implemented in the one or more sub-content areas constituting the content area, the chat partner classification output signal may be implemented in the chat partner classification cursor area which is the one or more sub-cursor areas corresponding to the one or more sub-content areas, the one or more sub-content areas in which the chat room participant list output signal is implemented may be classified by the one or more chat partner classification cursor areas corresponding to the one or more sub-content areas, and the chat partner classification cursor areas may identify the chat room participants by the mutually different braille outputs of the tactile interface device 1000.

In other words, the user may confirm the list of the chat room participants in the content area by the chat room participant list display unit, and may distinguish between a chat content of the user and chat contents of the chat room participants which are transmitted and received by the chat conducting unit 55200 by confirming the braille output displayed on the chat partner classification cursor area corresponding to an account of the chat room participant.

Preferably, wherein the chat conducting module 55000 may further include: a chat content history display unit for displaying chat content history display data for a chat content history of the user and the chat participants on the screen of the computing device A; and a chat content history search unit for moving through the chat content to search for data by a user input inputted to the tactile interface device 1000, the TUI module 51000 may generate a chat content history output signal for implementing a tactile screen of the tactile interface device 1000 corresponding to a screen of the computing device based on the chat content history display data and may generate a chat content history search input signal, which is to be inputted to the chat content history search unit, from the user input inputted to the tactile interface device 1000, the chat content history output signal may be implemented in the content area and can be implemented in the one or more sub-content areas constituting the content area, the chat partner classification output signal may be implemented in the chat partner classification cursor area which is the one or more sub-cursor areas corresponding to the one or more sub-content areas, the one or more sub-content areas in which the chat content history output signal is implemented may be classified by the one or more chat partner classification cursor areas corresponding to the one or more sub-content areas, and the chat partner classification cursor areas may identify the chat room participants by the mutually different braille outputs of the tactile interface device.

In other words, the user may search a previous chat content history even during the chat with the chat participants through the chat conducting module 55000, and the chat partners included in the chat content history may be distinguished from each other by an indication on the chat partner classification cursor area.

Figure 34:
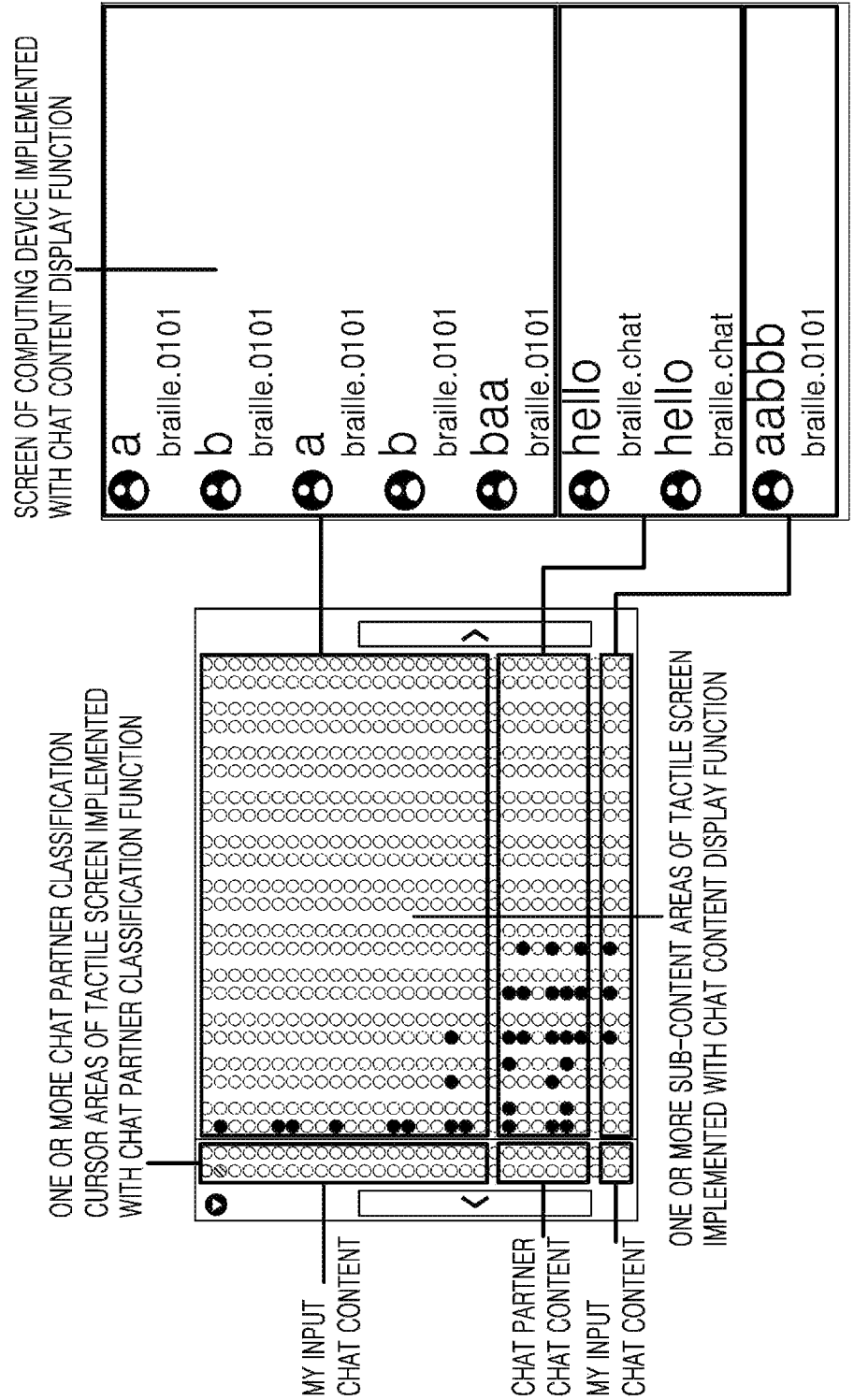
FIG. 34 is a view showing a screen of the tactile interface device in which the TUI module is executed with respect to a screen of the computing device according to an operation of a chat content history display unit of the chat conducting module according to an embodiment of the present invention.

FIG. 34 is a view showing a screen of the tactile interface device in which the TUI module is executed with respect to a screen of the computing device according to an operation of a chat content history display unit of the chat conducting module according to an embodiment of the present invention.

As shown in FIG. 34, the chat content history output signal may be implemented in the one or more sub-content areas of the tactile screen of the tactile interface device 1000, and the chat partner for the chat content history output signal implemented in the one or more sub-content areas may be identified by the one or more chat partner classification cursor areas corresponding to the one or more sub-content areas.

Particularly, in the one or more chat partner classification cursor areas corresponding to the one or more sub-contents areas as described above, different braille outputs according to the embodiment are displayed on the one or more chat partner classification cursor areas shown in FIG. 33, and the user may distinguish the user and the chat room participants who have inputted the chat contents from each other.

The above-mentioned device may be implemented by hardware components, software components, and/or a combination of the hardware components and the software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. In some cases, one processing device is used for the further understanding. However, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, may be possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, thereby being stored or executed in a distributed manner.

The software and data may be stored in at least one computer-readable recording media.

The method according to the embodiment may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vice versa.

Although the above embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A system comprising:
   a computing device including a processor configured to execute a chatting application to provide a chat with a chat partner;
   a tactile interface device including a tactile screen, and configured to be connected to the computing device to interact with a user, wherein
   the processor of the computing device is configured to:
     trigger an execution of the chatting application in response to a detection of a connection with the tactile interface device;
     manage a user account of the user;
     manage one or more chat partners registered in the user account;
     manage a chat room where the registered one or more chat partners are present;
     conduct the chat with chat room participants including the one or more chat partners in the chat room;
     convert display data displayed on a screen of the computing device into an output signal to control the tactile screen of the tactile interface device;
     generate a chat-related output signal to control the tactile screen of the tactile interface device corresponding to the screen of the computing device, the chat-related output signal including a control signal for a two-dimensional tactile cell array of the tactile interface device; and
     generates a chat-related input signal based on a user input inputted to the tactile interface device and transmitted to the computing device,
   the tactile screen of the tactile display device includes:
     a content area including a plurality of sub-content areas, and configured to be controlled in response to a content part of a screen displayed on the computing device; and
     a cursor area, including a plurality of sub-cursor areas, and configured to be controlled in response to a position and a shape of a user cursor, the position corresponding to a position of a focused sub-content area, among the plurality of sub-content areas,
   the plurality of sub-content areas are vertically aligned on a first single axis,
   the plurality of sub-cursor areas are vertically aligned on a second single axis,
   a respective sub-cursor area of the plurality of sub-content areas are horizontally aligned on a third single axis, and
   the respective sub-cursor area is configured to provide:
     an input selection cursor area configured to receive the user input for selecting the sub-content area corresponding to the respective sub-cursor area; and
     a chat partner classification cursor configured to identify the chat room participants including the one or more chat partners who input a chat content displayed in the chat room.

2. The system of claim 1, wherein the processor is further configured to:
   generate the user account by registering a user authentication device of the user;
   access the user account with the registered user authentication device; and
   disconnect the accessed user account.

3. The system of claim 1, wherein the processor is further configured to:
   manage a chat partner list including the one or more chat partners registered in the user account;

add a new chat partner to the chat partner list by inputting a user account of the new chat partner; and
delete one or more chat partners selected from the one or more chat partners included in the chat partner list.

4. The system of claim 3, wherein the processor is further configured to:
display chat partner list display data for the chat partner list including the one or more chat partners on the screen of the computing device; and
select the one or more chat partners from the one or more chat partners included in the chat partner list based on the user input inputted to the tactile interface device,
wherein the processor is further configured to:
generate a chat partner list output signal for controlling the tactile screen of the tactile interface device to be corresponding to the screen of the computing device based on the chat partner list display data; and
generate a chat partner selection input signal, which is configured to be used for selecting the one or more chat partners from the one or more chat partners included in the chat partner list, based on the user input inputted to the tactile interface device, and
wherein
the chat partner list output signal is implemented in the content area and is able to be implemented in one or more sub-content areas of the plurality of sub-content areas,
the chat partner selection input signal is selected by one or more input selection cursor areas corresponding to the one or more sub-content areas in which the chat partner list output signal is implemented to input data,
the one or more chat partners are implemented in the one or more sub-content areas in which the chat partner list output signal is implemented, and
the one or more chat partners are selected by the one or more input selection cursor areas corresponding to the one or more sub-content areas, respectively.

5. The system of claim 4, wherein the processor is further configured:
display chat room open display data for opening the chat room shared with the chat room participants including the one or more chat partners, which are selected based on the user input, on the screen of the computing device; and
create the chat room where the chat participants are present based on the user input inputted to the tactile interface device,
wherein the processor is further configured to:
generate a chat room open output signal for controlling the tactile screen of the tactile interface device to be corresponding to the screen of the computing device based on the chat room open display data; and
generate a chat room open input signal, which is configured to be used for creating the chat room, based on the user input inputted to the tactile interface device, and
wherein
the chat room open output signal is implemented in the one or more sub-content areas included in the content area in which the chat partner list output signal is implemented, and
the chat room open input signal is selected by one or more input selection cursor areas corresponding to the one or more sub-content areas in which the chat room open output signal is implemented to input data.

6. The system of claim 5, wherein processor is further configured to:
display chat conducting display data for conducting the chat with the chat room participants in the chat room, on the screen of the computing device; and
transmit a chat content of the user inputted to the tactile interface device to the chat participants and receive chat contents inputted by the chat participants,
wherein the processor is further configured to:
display chat partner classification display data to identify the user and the chat room participants who input the chat contents in the chat room on the screen of the computing device;
display input chat content display data for the chat content of the user inputted to the tactile interface device on the screen of the computing device; and
display received chat content display data for the received chat contents inputted by the chat participants on the screen of the computing device,
wherein the processor is further configured to:
generate a chat conducting output signal including a chat partner classification output signal, an input chat content output signal, and a received chat content output signal to control the tactile screen of the tactile interface device to be corresponding to the screen of the computing device based on the chat conducting display data including the chat partner classification display data, the input chat content display data, and the received chat content display data, and
generate a chat conducting input signal including the chat content of the user, which is configured to be used for transmitting the chat content of the user inputted to the tactile interface device to the chat participants, based on the user input inputted to the tactile interface device, and
wherein
the chat conducting output signal is implemented in the content area,
the input chat content output signal and the received chat content output signal are implemented in the one or more sub-content areas constituting the content area in which the chat conducting output signal is implemented,
the chat partner classification output signal is implemented in the chat partner classification cursor area which is the one or more sub-cursor areas corresponding to the one or more sub-content areas,
the one or more sub-content areas in which the input chat content output signal and the received chat content output signal are implemented are classified by one or more chat partner classification cursor areas corresponding to the one or more sub-content areas, and
the chat partner classification cursor areas identify the user and the chat room participants by mutually different braille outputs of the tactile interface device.

7. The system of claim 6, wherein the processor is further configured to display chat room participant list display data for a chat room participant list including the chat room participants on the screen of the computing device,
wherein the processor is further configured to generate a chat room participant list output signal for controlling the tactile screen of the tactile interface device to be corresponding to the screen of the computing device based on the chat room participant list display data, and wherein
the chat room participant list output signal is implemented in the content area and is able to be implemented in the one or more sub-content areas constituting the content area,
the chat partner classification output signal is implemented in the chat partner classification cursor area which is the one or more sub-cursor areas corresponding to the one or more sub-content areas,
the one or more sub-content areas in which the chat room participant list output signal is implemented are classified by the one or more chat partner classification cursor areas corresponding to the one or more sub-content areas, and
the chat partner classification cursor areas identify the chat room participants by the mutually different braille outputs of the tactile interface device.

8. A method implemented by a computing device including a processor configured to execute a chatting application to provide a chat with a chat partner, by a tactile interface device including a tactile screen and configured to be connected to the computing device to interact with a user, the method comprising:
triggering, by the processor, an execution of the chatting application in response to a detection of a connection with the tactile interface device;
managing, by the processor, a user account of the user;
managing, by the processor, one or more chat partners registered in the user account;
managing, by the processor, a chat room where the registered one or more chat partners are present;
conducting, by the processor, the chat with chat room participants including the one or more chat partners in the chat room;
converting, by the processor, display data displayed on a screen of the computing device into an output signal to control the tactile screen of the tactile interface device;
generating, by the processor, a chat-related output signal to control the tactile screen of the tactile interface device corresponding to the screen of the computing device, the chat-related output signal including a control signal for a two-dimensional tactile cell array of the tactile interface device;
generating, by the processor, a chat-related input signal based on a user input inputted to the tactile interface device and transmitted to the computing device;
providing, by the tactile screen of the tactile display device:
a content area including a plurality of sub-content areas, and configured to be controlled in response to a content part of a screen displayed on the computing device; and
a cursor area, including a plurality of sub-cursor areas, and configured to be controlled in response to a position and a shape of a user cursor, the position corresponding to a position of a focused sub-content area, among the plurality of sub-content areas, wherein
the plurality of sub-content areas are vertically aligned on a first single axis,
the plurality of sub-cursor areas are vertically aligned on a second single axis,
a respective sub-cursor area of the plurality of sub-content areas are horizontally aligned on a third single axis; and
providing, by the tactile screen of the tactile display device, the respective sub-cursor area including:
an input selection cursor area configured to receive the user input for selecting the sub-content area corresponding to the respective sub-cursor area; and
a chat partner classification cursor configured to identify the chat room participants including the one or more chat partners who input a chat content displayed in the chat room.

9. A non-transitory computer-readable medium for providing a chat device for a chat to a visually impaired user through a tactile interface device including a tactile screen and configured to be connected to a computing device including a processor, wherein the non-transitory computer-readable medium stores instructions for allowing the computing device to execute:
triggering, by the processor, an execution of the chatting application in response to a detection of a connection with the tactile interface device;
managing, by the processor, a user account of the user;
managing, by the processor, one or more chat partners registered in the user account;
managing, by the processor, a chat room where the registered one or more chat partners are present;
conducting, by the processor, the chat with chat room participants including the one or more chat partners in the chat room;
converting, by the processor, display data displayed on a screen of the computing device into an output signal to control the tactile screen of the tactile interface device;
generating, by the processor, a chat-related output signal to control the tactile screen of the tactile interface device corresponding to the screen of the computing device, the chat-related output signal including a control signal for a two-dimensional tactile cell array of the tactile interface device;
generating, by the processor, a chat-related input signal based on a user input inputted to the tactile interface device and transmitted to the computing device;
providing, by the tactile screen of the tactile display device:
a content area including a plurality of sub-content areas, and configured to be controlled in response to a content part of a screen displayed on the computing device; and
a cursor area, including a plurality of sub-cursor areas, and configured to be controlled in response to a position and a shape of a user cursor, the position corresponding to a position of a focused sub-content area, among the plurality of sub-content areas, wherein
the plurality of sub-content areas are vertically aligned on a first single axis,
the plurality of sub-cursor areas are vertically aligned on a second single axis,
a respective sub-cursor area of the plurality of sub-content areas are horizontally aligned on a third single axis; and
providing, by the tactile screen of the tactile display device, the respective sub-cursor area including:
an input selection cursor area configured to receive the user input for selecting the sub-content area corresponding to the respective sub-cursor area; and
a chat partner classification cursor configured to identify the chat room participants including the one or more chat partners who input a chat content displayed in the chat room.

\* \* \* \* \*